United States Patent
Saigusa et al.

(10) Patent No.: US 12,174,482 B2
(45) Date of Patent: Dec. 24, 2024

(54) DISPLAY DEVICE

(71) Applicant: Sharp Display Technology Corporation, Kameyama (JP)

(72) Inventors: Ryosuke Saigusa, Kameyama (JP); Akira Sakai, Kameyama (JP); Yuichi Kawahira, Kameyama (JP); Masahiro Hasegawa, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/239,318

(22) Filed: Aug. 29, 2023

(65) Prior Publication Data

US 2024/0103314 A1   Mar. 28, 2024

(30) Foreign Application Priority Data

Sep. 28, 2022   (JP) .................................. 2022-155160

(51) Int. Cl.
*G02F 1/1335* (2006.01)
*G02F 1/13* (2006.01)
*G02F 1/1333* (2006.01)

(52) U.S. Cl.
CPC ...... *G02F 1/133531* (2021.01); *G02F 1/1309* (2013.01); *G02F 1/133308* (2013.01)

(58) Field of Classification Search
None
See application file for complete search history.

(56) References Cited

U.S. PATENT DOCUMENTS

2010/0289988 A1* 11/2010 Sakai .................. G02F 1/13363
349/96

FOREIGN PATENT DOCUMENTS

| CN | 101261397 A | * | 9/2008 | |
|---|---|---|---|---|
| CN | 113156566 A | * | 7/2021 | |
| JP | 2021-135438 A | | 9/2021 | |
| WO | WO-2013005554 A1 | * | 1/2013 | ............. G02B 6/005 |
| WO | WO-2019244923 A1 | * | 12/2019 | |
| WO | WO-2020195225 A1 | * | 10/2020 | ............. B32B 7/023 |

* cited by examiner

*Primary Examiner* — Phu Vu
(74) *Attorney, Agent, or Firm* — ScienBiziP, P.C.

(57) ABSTRACT

Provided is a display device in which warping of a display panel is sufficiently reduced or prevented. The display device includes: a display panel; and a polarizer, the polarizer being provided with at least one notch that extends inward from an outer edge of the polarizer.

18 Claims, 15 Drawing Sheets

DISPLAY DEVICE

CROSS-REFERENCE TO RELATED APPLICATIONS

The present application claims priority under 35 U.S.C. § 119 to Japanese Patent Application No. 2022-155160 filed on Sep. 28, 2022, the contents of which are incorporated herein by reference in their entirety.

BACKGROUND OF THE INVENTION

Field of the Invention

The following disclosure relates to display devices.

Description of Related Art

Display devices including a display panel such as a liquid crystal panel are widely used in displays for television sets, mobile phones, PCs, and other various devices. A display device commonly includes a display panel and polarizers. For example, a liquid crystal display device typically has a structure in which a liquid crystal panel is sandwiched between a pair of polarizers.

Production process of a display device commonly includes heating a display panel to which polarizers have been attached. The heating possibly causes the polarizers to shrink. JP 2021-135438 A states that when a sheet-shaped polyimide substrate is used, shrinkage of polarizers is followed by overall shrinkage of the polyimide substrate, which causes pixel misalignment to decrease the reliability of the display device. JP 2021-135438 A thus suggests solving this issue by a technique of, in a display device having a structure including a dimmable layer and a substrate between a pair of polarizers, providing notches spaced from one another to one of the polarizers (first polarizer).

FIG. 22 and FIG. 23 are each a schematic view of a typical example of a conventional display device. A conventional display device 1R has a configuration including a display panel 200 and a polarizer 100 attached to the display panel 200 as shown in FIG. 22 or a configuration including a display panel 200 sandwiched between a pair of polarizers 110 and 120 as shown in FIG. 23.

Production process of a display device commonly includes heating a display panel to which one or more polarizers have been attached. Such polarizers, however, possibly shrink at high temperatures. In other words, a polarizer, when heated, shrinks to a greater extent in an absorption axis direction while shrinking to a lesser extent in the transmission axis direction. Shrinkage of a polarizer creates stresses within the display panel to warp the display panel. A large difference between the shrinkage force in the transmission axis direction and the shrinkage force in the absorption axis direction is regarded as one of the factors that contribute to an increase in degree of warping. Warping of a display panel can cause light leakage due to photoelasticity of glass or defects in further attaching cover glass to the display panel. Such warping therefore needs to be sufficiently reduced or prevented.

In particular, in a display device having a configuration including a display panel 200 sandwiched between a pair of polarizes 110 and 120 that are arranged in crossed Nicols (e.g., see FIG. 23), the absorption axis a in which the shrinkage force(s) is large and the transmission axis b in which the shrinkage force (s) is small are parallel to each other across the display panel 200. This arrangement creates a shrinkage force differential between the front and back of the display panel 200, thus increasing the degree of warping. FIG. 24 conceptually shows the relationship between warping and the absorption axis direction a or the transmission axis direction b of each of the polarizers 110 and 120 in the display device above. The display panel to which the polarizers are attached, when exposed to heat, experiences shrinkage of the polarizers that creates stresses deforming the display panel. In this case, as shown in FIG. 24, warping occurs where, in the absorption axis direction a (110a) of the polarizer 110 disposed on one side (defined as the viewing surface side) of the display panel, the display panel deforms to be concave on the viewing surface side (i.e., convex on the back surface side) and, in the absorption axis direction (120a) of the polarizer 120 disposed on the other side (defined as the back surface side) of the display panel, the display panel deforms to be concave on the back surface side (i.e., convex on the viewing surface side) (see FIG. 24). This type of warping is caused by a large shrinkage force in the absorption axis direction a of a polarizer and a small shrinkage force in the transmission axis direction b of a polarizer (see FIG. 25A, FIG. 25B, and FIG. 25C). FIG. 25A, FIG. 25B, and FIG. 25C are each a study diagram of the cause of warping in the display device above.

FIG. 25A, FIG. 25B, and FIG. 25C each show an example in which in a display device having a configuration including the display panel 200 sandwiched between the pair of polarizers 110 and 120 arranged in crossed Nicols (e.g., see FIG. 23), the absorption axis direction a of the first polarizer 110 is parallel to the long sides of the display panel 200 and the absorption axis direction a of the second polarizer 120 is parallel to the short sides of the display panel 200.

FIG. 25A schematically shows the relationship between the absorption axis direction a (110a) of the polarizer 110 and the absorption axis direction a (120a) of the polarizer 120 when the display panel 200 is observed from the viewing surface side (polarizer 110 side). FIG. 25B is a schematic view showing warping of the display panel 200 when a long side of the display panel 200 is viewed from the side. FIG. 25C is a schematic view showing warping of the display panel 200 when a short side of the display panel 200 is observed from the side. As in FIG. 24, when the absorption axis direction a of the polarizer 110 disposed on the viewing surface side of the display panel 200 is observed from the side, the display panel 200 is warped to be concave on the viewing surface side (i.e., convex on the back surface side) (see FIG. 25B), while when the absorption axis direction a of the polarizer 120 disposed on the back surface side of the display panel 200 is observed from the side, the display panel 200 is warped to be concave on the back surface side (i.e., convex on the viewing surface side) (see FIG. 25C).

Although the relationship between the absorption axis a and the transmission axis b of absorptive polarizers has been examined above, the same relationship applies to a reflective polarizer. In other words, the large shrinkage force in the reflection axis direction a and the small shrinkage force in the transmission axis direction b is regarded as one of the factors that contribute to an increase in degree of warping, and the type of warping is considered to be the same as shown in FIG. 24, FIG. 25A, FIG. 25B, and FIG. 25C (in this case, the absorption axis direction a (110a, 120a) in the drawings is taken as the reflection axis direction a (110a, 120a)).

JP 2021-135438 A, as described above, discloses a technique of providing notches to one of the pair of polarizers. A notch in JP 2021-135438 A is an aperture formed using a die or laser and is provided to at least the display part of the display device and possibly to the surrounding parts. This technique, however, is impractical because the processing for forming notches is difficult and may have a risk of affecting the display quality.

In response to the above issues, an object of the present invention is to provide a display device in which warping of a display panel is sufficiently reduced or prevented.

BRIEF SUMMARY OF THE INVENTION (1) One embodiment of the present invention is directed to a display device including: a display panel; and a polarizer, the polarizer being provided with at least one notch that extends inward from an outer edge of the polarizer.

(2) In an embodiment of the present invention, the display device includes the structure (1), the display device includes a display region and a frame region arranged to surround the display region, and the notch is provided only in the frame region.

(3) The other embodiment of the present invention is directed to a display device including: a display panel; a first polarizer; and a second polarizer, the first polarizer, the display panel, and the second polarizer are arranged in the stated order, a transmission axis of the first polarizer and a transmission axis of the second polarizer are orthogonal to each other, and at least one selected from the group consisting of the first polarizer and the second polarizer is provided with at least one notch that extends inward from an outer edge of the polarizer.

(4) In an embodiment of the present invention, the display device includes the structure (1), (2), or (3), the polarizer provided with the notch includes a protective layer, an adhesion layer, and a polarizing layer, and at least one layer selected from the group consisting of the protective layer, the adhesion layer, and the polarizing layer is provided with the notch.

(5) In an embodiment of the present invention, the display device includes the structure (1), (2), (3), or (4), and the polarizer is a linear polarizer.

(6) In an embodiment of the present invention, the display device includes the structure (1), (2), (3), (4), or (5), and the display panel is a liquid crystal panel including a liquid crystal layer.

(7) In an embodiment of the present invention, the display device includes the structure (1), (2), (3), (4), (5), or (6), and further includes a light source.

(8) In an embodiment of the present invention, the display device includes the structure (1), (2), (3), (4), (5), (6), or (7), and the at least one notch comprises two or more notches, and the two or more notches are arranged in an absorption axis direction or a reflection axis direction of the polarizer.

(9) In an embodiment of the present invention, the display device includes the structure (8), and the two or more notches are arranged at equal intervals.

(10) In an embodiment of the present invention, the display device includes the structure (1), (2), (3), (4), (5), (6), (7), (8), or (9), and the polarizer has a quadrangular planar shape, the at least one notch comprises two or more notches, the two or more notches include one or more first notches provided in a first side of the polarizer and one or more second notches provided in a second side of the polarizer opposite to the first side.

(11) In an embodiment of the present invention, the display device includes the structure (10), and in a view of the polarizer from a direction in which the first side and the second side are opposite to each other, positions of the one or more first notches and positions of the one or more second notches are respectively matched.

(12) In an embodiment of the present invention, the display device includes the structure (10) or (11), and the one or more first notches include a first notch provided in a center of the first side, and the one or more second notches include a second notch provided in a center of the second side.

(13) In an embodiment of the present invention, the display device includes the structure (3), (4), (5), (6), (7), (8), (9), (10), (11) or (12), and the first polarizer and the second polarizer are each provided with the notch, and the notch in the first polarizer does not overlap the notch in the second polarizer.

(14) In an embodiment of the present invention, the display device includes the structure (4), (5), (6), (7), (8), (9), (10), (11), (12), or (13), and at least two layers selected from the group consisting of the protective layer, the adhesion layer, and the polarizing layer are provided with the notch, and positions of the notches in the at least two layers are matched.

The present invention can provide a display device in which warping of the display panel is sufficiently reduced or prevented.

DETAILED DESCRIPTION OF THE INVENTION

Definition of Terms

A "viewing surface side" herein means a side closer to the screen (display surface) of the display device. A "back surface side" herein means a side farther from the screen (display surface) of the display device.

Being "parallel" herein means that an angle (absolute value) formed between two objects falls within the range of 0°±10°, preferably the range of 0°±5°, more preferably the range of 0°±3°, still more preferably the range of 0°±1°, particularly preferably 0° (completely parallel).

Being "orthogonal" herein means that an angle (absolute value) formed between two objects falls within the range of 90°±10°, preferably the range of 90°±5°, more preferably the range of 90°±3°, still more preferably the range of 90°±1°, particularly preferably 90° (completely orthogonal).

Display devices of embodiments of the present invention are described below. The present invention is not limited to the contents described in the following embodiments, and appropriate modifications can be made on the design within the scope of the configurations of the present invention. In FIG. 1, FIG. 4 to FIG. 12, FIG. 14, FIG. 16, FIG. 18, FIG. 20 to FIG. 24, FIG. 25B, FIG. 25C, FIG. 26A, and FIG. 26B, the upper side corresponds to the viewing surface side and the lower side corresponds to the back surface side.

Embodiment 1

Figure 1:
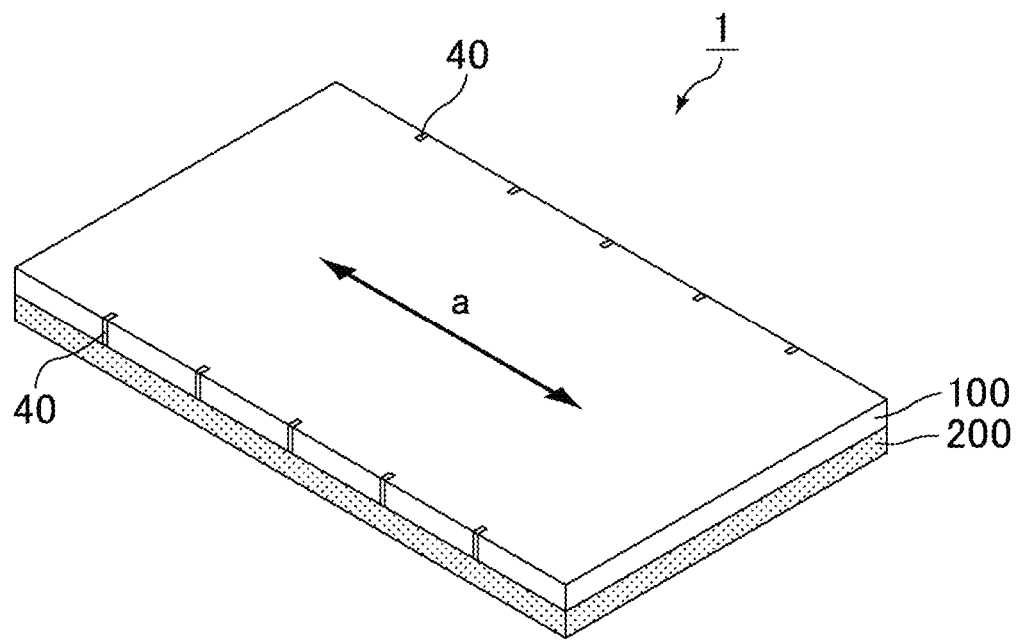
FIG. 1 is a schematic view of a display device of Embodiment 1.
Figure 2:
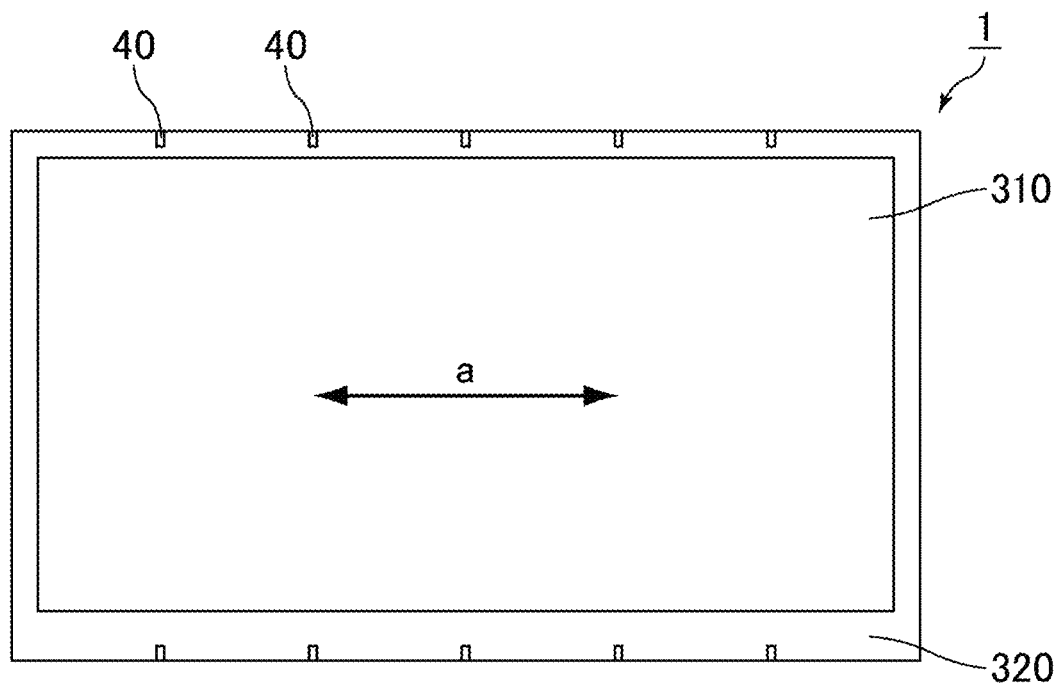
FIG. 2 is a schematic plan view of the viewing surface side of the display device of Embodiment 1.

FIG. 1 is a schematic view of a display device of the present embodiment. FIG. 2 is a schematic plan view of the viewing surface side of the display device of Embodiment 1. As shown in FIG. 1, a display device 1 includes a polarizer 100 and a display panel 200 from the viewing surface side. The display device 1, as shown in FIG. 2, includes a display region 310 and a frame region 320 arranged to surround the display region 310. The display region 310 is a region on which an image or any other object is displayed. In other words, the display region 310 is a region to be perceived in observation of the viewing surface side of the display device 1 with a light source turned on. The frame region 320 is a frame-shaped region arranged to surround the display region 310. The frame region 320 may not transmit light.

Figure 26A:
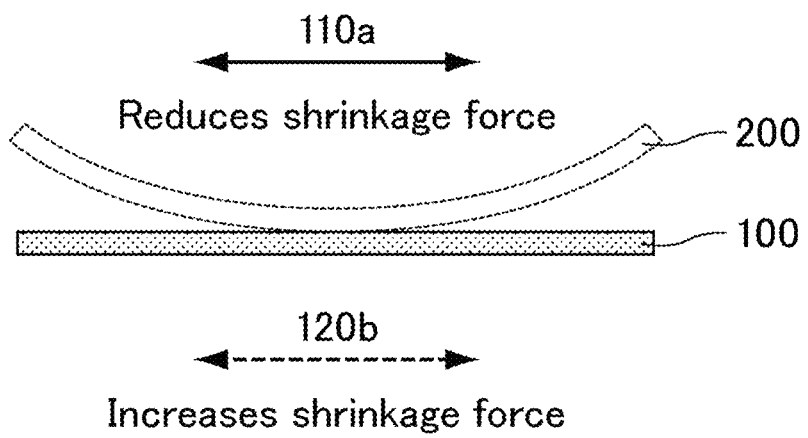
FIG. 26A is a diagram conceptually showing the mechanism of reducing warping in the present invention.
Figure 26B:
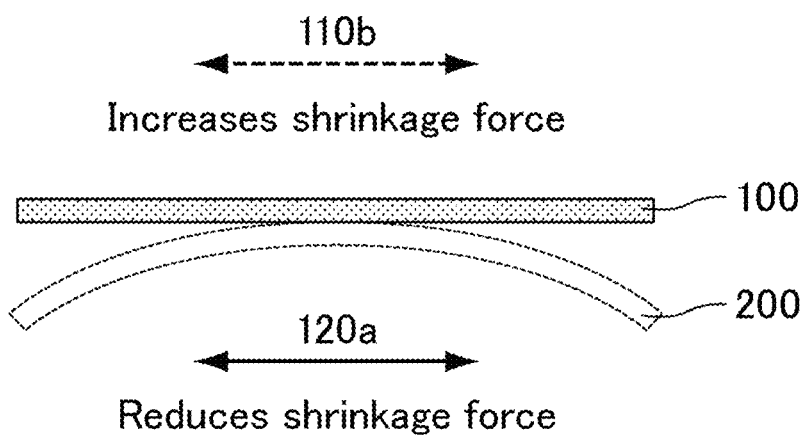
FIG. 26B is another diagram conceptually showing the mechanism of reducing warping in the present invention.

As described above, a display panel to which polarizers are attached, when exposed to heat, experiences shrinkage of the polarizers that creates stresses deforming the display panel (see FIG. 24, FIG. 25A, FIG. 25B, and FIG. 25C). The present inventors considered that for reduction in such warping, the difference in shrinkage force between the absorption axis direction (or reflection axis direction) and the transmission axis direction of the polarizers needs to be reduced. For example, they considered that, taking as an example a display device including a display panel 200 sandwiched between a pair of polarizers 110 and 120 arranged in crossed Nicols (e.g., see FIG. 23), the difference in shrinkage force between the absorption axis (or reflection axis) a and the transmission axis b of the polarizers parallel to each other across the display panel needs to be reduced. In other words, specifically, they considered that the shrinkage force in the absorption axis direction (or reflection axis direction) a of one polarizer needs to be reduced, and/or the shrinkage force in the transmission axis direction b of the other polarizer needs to be increased (see FIG. 26A and FIG. 26B). FIG. 26A and FIG. 26B are each a diagram conceptually showing the mechanism of reducing warping in the present invention. The inventors then found that providing polarizer with notches 40 that extend inward from the outer edge of the polarizer enables control of the balance between the shrinkage force in the absorption axis direction (or reflection axis direction) of one polarizer and the shrinkage force in the transmission axis direction of the other polarizer, thus sufficiently reducing or preventing warping. The inventors also found that the same principle is applicable to reduction or prevention of warping of a display device including one polarizer and a display panel (e.g., see FIG. 22). Thus, the present invention was completed.

The display device of the present embodiment may be in a circularly polarizing mode or in a linearly polarizing mode, and is suitably a display device in a linearly polarizing mode. Thus, the polarizer 100 may be a circular polarizer but is preferably a linear polarizer. A phase difference film or another optical film may be disposed between the display panel 200 and the polarizer 100. Yet, since the linearly polarizing mode is preferred as described above, the display device of the present invention suitably includes no phase difference film.

The polarizer 100 has notches 40 that extend inward from the outer edge thereof. A notch 40 has a shape in which a space defined by the notch 40 is connected to the edge (outer edge) of the polarizer, excluding a shape (also referred to an aperture) in which a space defined by a notch is not connected to the edge (outer edge) of the polarizer.

A notch 40 is formed by cutting the outer edge (edge) of the polarizer 100 toward the inside. For example, when the polarizer 100 has a quadrangular planar shape, cutting the edge of at least one side of the polarizer 100 toward the inside can form a notch 40 in the polarizer. When the polarizer 100 has a quadrangular planar shape, the side to be provided with a notch 40 is not limited and may be at least one side of the polarizer. Suitably, in terms of further reduction or prevention of warping, the two opposite sides are each provided with one or more notches 40 (see FIG. 1 and FIG. 2). When the polarizer 100 has a rectangular planar shape, the side (s) to be provided with a notch 40 may be the long side (s) or the short side(s). FIG. 1 and FIG. 2 show the notches 40 provided to the two opposite sides are at the positions that are line-symmetric about the central line defining the center of the short sides of the display panel 200, but the arrangement of the notches 40 is not limited thereto. The notches 40 are not necessarily arranged to be line symmetric.

One or more notches 40 are provided per polarizer. For sufficient reduction or prevention of warping, two or more notches 40 are preferably provided per polarizer. For further reduction or prevention of warping, the two or more notches 40 are suitably arranged in the absorption axis direction (or reflection axis direction) a of the polarizer provided with the notches (see FIG. 1). For example, when the length of one side of a polarizer is 10 cm, 1 to 20 notches are suitably provided per side and 2 to 18 notches are preferably provided per side. In particular, for even more reduction or prevention of warping, 9 to 16 notches are more preferably provided per side. The two or more notches 40 are suitably arranged at equal intervals.

The notches 40 are preferably provided only in the frame region 320 of the display device 1 (see FIG. 2). This can sufficiently eliminate the influence of the notches on the display quality of the display device. The processing of providing the notches 40 only to within the frame region 320 is easy, and is therefore high in productivity as well.

Herein, the size of a notch in a direction substantially parallel to the absorption axis (or reflection axis) a of a polarizer is referred to as the "width (W) of the notch", and the size of the notch in a direction substantially parallel to the transmission axis b of the polarizer is referred to as the "length (L) of the notch". The direction substantially parallel to the absorption axis (or reflection axis) means a direction that is at an angle within 0°±45° (absolute value) from the absorption axis (or reflection axis) defined as 0°. The direction substantially parallel to the transmission axis means a direction that is at an angle smaller than 0°±45° (absolute value) from the transmission axis defined as 0°.

Figure 3A:
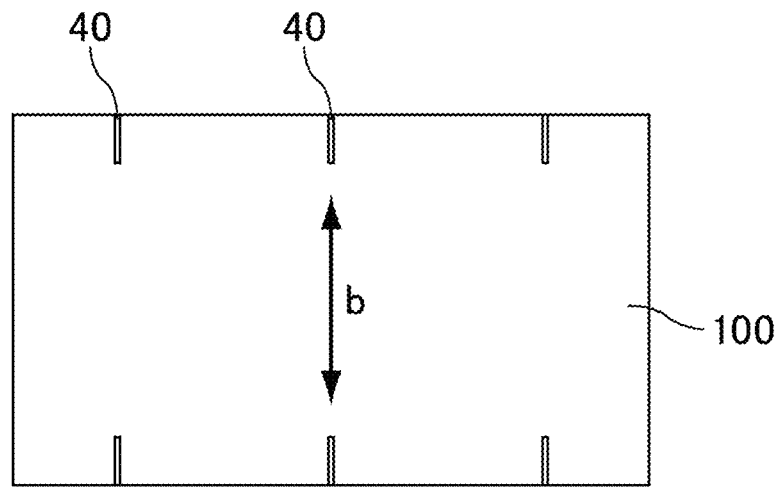
FIG. 3A is a diagram conceptually showing an arrangement example of notches 40.
Figure 3B:
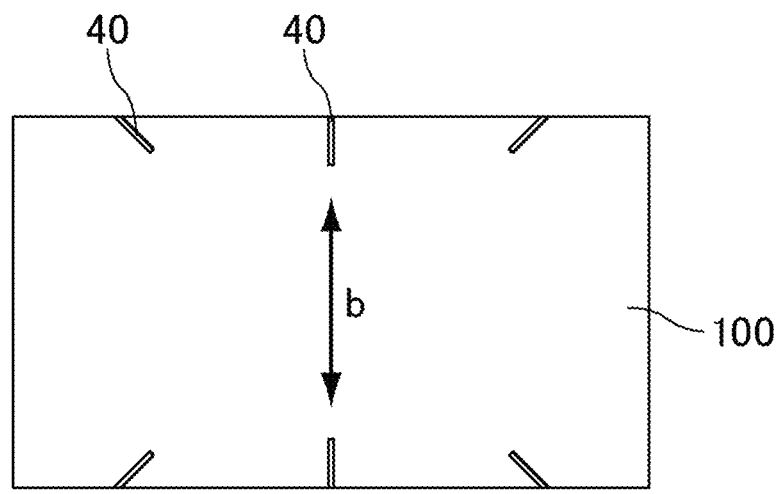
FIG. 3B is a diagram conceptually showing another arrangement example of notches 40.

The length direction of a notch 40 may be parallel to the transmission axis b of the polarizer (e.g., see FIG. 3A) or may not be parallel to the transmission axis b of the polarizer (e.g., see FIG. 3B). A state where the length direction of a notch 40 is parallel to the transmission axis b means a state where the angle (absolute value) formed between the transmission axis b and the length direction of the notch 40 falls within the range of 0°±10°. FIG. 3A and FIG. 3B are each a diagram conceptually showing an arrangement example of notches 40.

The length (L) of a notch 40 may be set as appropriate such that the notch 40 is within the frame region 320 (see FIG. 2). For example, the length (L) is preferably 1 mm or longer, more preferably 1.5 mm or longer. The length (L) is also preferably 10 mm or shorter, more preferably 5 mm or shorter.

The width (W) of a notch 40 is 0 mm or greater, preferably 0.1 mm or greater, more preferably 0.5 mm or greater. The width (W) is preferably 3 mm or smaller, more preferably 1.5 mm or smaller.

Figure 4:
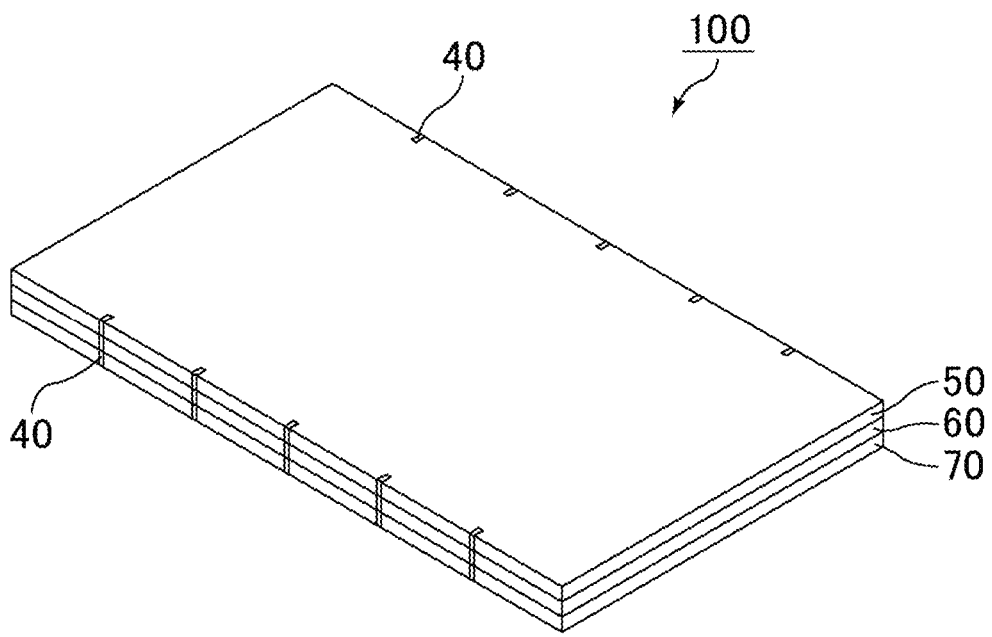
FIG. 4 is a diagram conceptually showing an example of the structure of a polarizer.

The polarizer 100 provided with the notches 40 suitably includes, as shown in FIG. 4, a protective layer 50, an adhesion layer 60, and a polarizing layer 70, and at least one layer selected from the group consisting of the protective layer 50, the adhesion layer 60, and the polarizing layer 70 is provided with the notches 40. In particular, as shown in FIG. 4, each of the protective layer 50, the adhesion layer 60, and the polarizing layer 70 is provided with the notches 40. FIG. 4 is a diagram conceptually showing an example of the structure of a polarizer. When at least two layers selected from the group consisting of the protective layer 50, the adhesion layer 60, and the polarizing layer 70 are provided with the notches 40, the positions of the notches 40 are suitably aligned (matched). In FIG. 4, the positions of the notches 40 in the protective layer 50, the adhesion layer 60, and the polarizing layer 70 are aligned. Although FIG. 4 shows a stack structure of three layers, a five-layer structure including a protective layer 50, an adhesion layer 60, a polarizing layer 70, another adhesion layer 60, and another protective layer 50 arranged in the stated order is also suitable. Also, the display device may further include other layer (s).

The protective layer 50 is suitably disposed on at least one of the viewing surface side or the back surface side of an element having the polarization function (also referred to as a polarizing layer 70). Non-limiting specific preferred examples of the protective layer 50 include protective films such as a triacetyl cellulose (TAC) film. The protective layer 50 is attached to the polarizing layer 70 via any appropriate adhesion layer 60.

The adhesion layer 60 is a layer that bonds the surfaces of adjacent optical elements or layers to unify them with practically sufficient adhesion strength in a practically sufficient adhesion time. The adhesion layer 60 is formed from a material such as an adhesive or an anchor coating agent. The adhesion layer 60 may have a multilayered structure in which an anchor coating layer is formed on a surface of an adherend and an adhesion layer is formed thereon. The adhesion layer 60 may also be a thin layer not perceptible to the naked eye.

The polarizer 100 may be an absorptive polarizer or a reflective polarizer, and is preferably an absorptive polarizer. Specific examples of the absorptive polarizer include polarizers obtained by dyeing a polyvinyl alcohol film with an anisotropic material such as an iodine complex (or a dye), adsorbing the material onto the film, and then stretching the film for alignment. Typically, for achievement of the mechanical strength and the heat moisture resistance, each side of the polyvinyl alcohol film is laminated with a protective film such as a triacetyl cellulose film when put into practical use. Specific examples of the reflective polarizer include a film that is a stack of dielectric thin films, a film that is a stack of thin films with different refractive index anisotropies, a nano-wire grid polarizer, and a polarizer using selective reflection of cholesteric liquid crystals.

The display panel 200 may be any display panel that has a function of displaying images. The display panel 200 can switch between on and off states of image display. The display panel 200 is preferably, for example, a liquid crystal display panel or a self-luminous panel. When the display panel 200 is a liquid crystal panel, the display device 1 is a liquid crystal display device. The present embodiment shows as an example a case where the display panel 200 is a liquid crystal panel.

The liquid crystal panel is a display panel including a liquid crystal layer. The configuration thereof is not limited and may be, for example, a configuration that includes a liquid crystal layer sandwiched between a pair of substrates, one of the substrates including pixel electrodes and a common electrode, and that provides display by applying voltage between the pixel electrodes and the common electrode and by generating a transverse electric field (including a fringe electric field) in the liquid crystal layer; and a configuration that includes a liquid crystal layer sandwiched between a pair of substrates, one of the substrates including pixel electrodes and the other of the substrates including a common electrode, and that provides display by applying voltage between the pixel electrodes and the common electrode and by generating a vertical electric field in the liquid crystal layer. Specifically, examples of the transverse electric field method include the fringe field switching (FFS) mode and the in plane switching (IPS) mode where liquid crystal molecules in the liquid crystal layer with no voltage applied align parallelly to the substrate surfaces. Examples of the vertical electric field method include the vertical alignment (VA) mode where liquid crystal molecules in the liquid crystal layer with no voltage applied align vertically to the substrate surfaces.

The liquid crystal mode of the liquid crystal panel is not limited and may be a mode that provides black display by aligning the liquid crystal molecules in the liquid crystal layer vertically to the substrate surfaces, or a mode that provides black display by aligning the liquid crystal molecules in the liquid crystal layer in a direction that is not parallel or vertical to the substrates surfaces. The driving method of the liquid crystal panel may be the TFT method (active matrix method), the simple matrix method (passive matrix method), or the plasma address method, for example.

In the present embodiment, the polarizer 100 provided with the notches 40 can sufficiently reduce or prevent warping of the display panel 200. Yet, warping can be sufficiently reduced or prevented also when the display panel above includes a glass substrate. Thus, in the present embodiment, the substrates defining the liquid crystal panel may also each be a glass substrate.

The display device of the present embodiment may include a light source. When the display panel 200 is a liquid crystal panel, the panel suitably includes a backlight. The light source may be any light source that emits light, and may be a direct-lit light source, an edge-lit light source, or any other type of light source. Specifically, the light source preferably includes a light source unit including a light guide and a light source; a reflective sheet; and a diffusion sheet. The light source may be, for example, a light emitting diode (LED).

The display device of the present embodiment may also include cover glass on the outermost viewing surface of the display device. Since warping of the display panel 200 is sufficiently reduced or prevented in the present embodiment, the possible defects that can occur when cover glass is attached can be sufficiently eliminated.

The display device of the present embodiment may include, in addition to the members described above, members such as external circuits, including a tape carrier package (TCP) and a printed circuit board (PCB); optical films, including a viewing angle-increasing film and a luminance-increasing film; and a bezel (frame). Members other than the members already described above are not limited and may each be one usually used in the field of display devices. Thus, description thereof is omitted.

Embodiment 2

The features unique to the present embodiment are mainly described here, and description of the same features as in Embodiment 1 is omitted. Embodiment 2 shows a case where the display device includes a display panel sandwiched between a pair of polarizers.

Figure 5:
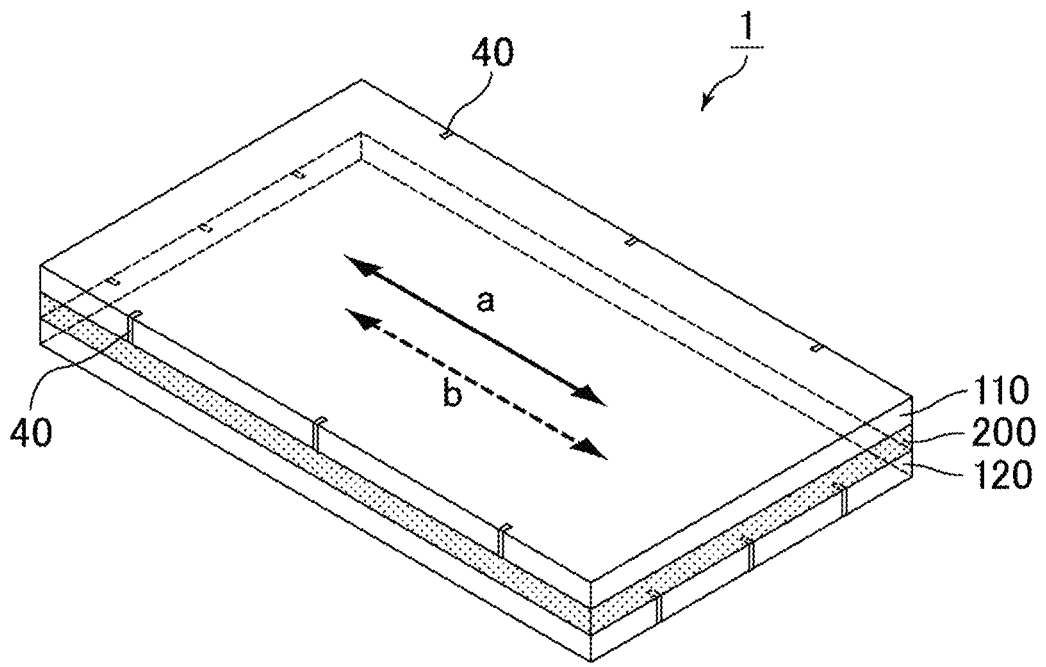
FIG. 5 is a schematic view of a display device of Embodiment 2.

FIG. 5 is a schematic view of a display device of Embodiment 2. As shown in FIG. 5, a display device 1 includes a first polarizer 110, a display panel 200, and a second polarizer 120 in the stated order from the viewing surface side.

The transmission axis b of the first polarizer 110 and the transmission axis b of the second polarizer 120 are orthogonal to each other. In other words, the first polarizer 110 and the second polarizer 120 are arranged in crossed Nicols. Thus, the absorption axis (or reflection axis) a of the first polarizer 110 and the transmission axis b of the second polarizer 120 are parallel to each other (see FIG. 5).

The first polarizer 110 and the second polarizer 120 are each provided with one or more notches 40. Preferably, the first polarizer 110 and the second polarizer 120 are each provided with two or more notches 40. A notch in the first polarizer 110 preferably does not overlap a notch in the second polarizer 120.

A display device including two or more polarizers may include a polarizer provided with a notch and a polarizer provided with no notch. Yet, for further reduction or prevention of warping, as in the present embodiment, each of the two or more polarizers is suitably provided with a notch.

Embodiment 3

Features unique to the present embodiment are mainly described here and description of the same features as in Embodiment 1 is omitted. Embodiment 3 shows a case where a display panel 200 is a self-luminous display panel.

Figure 6:
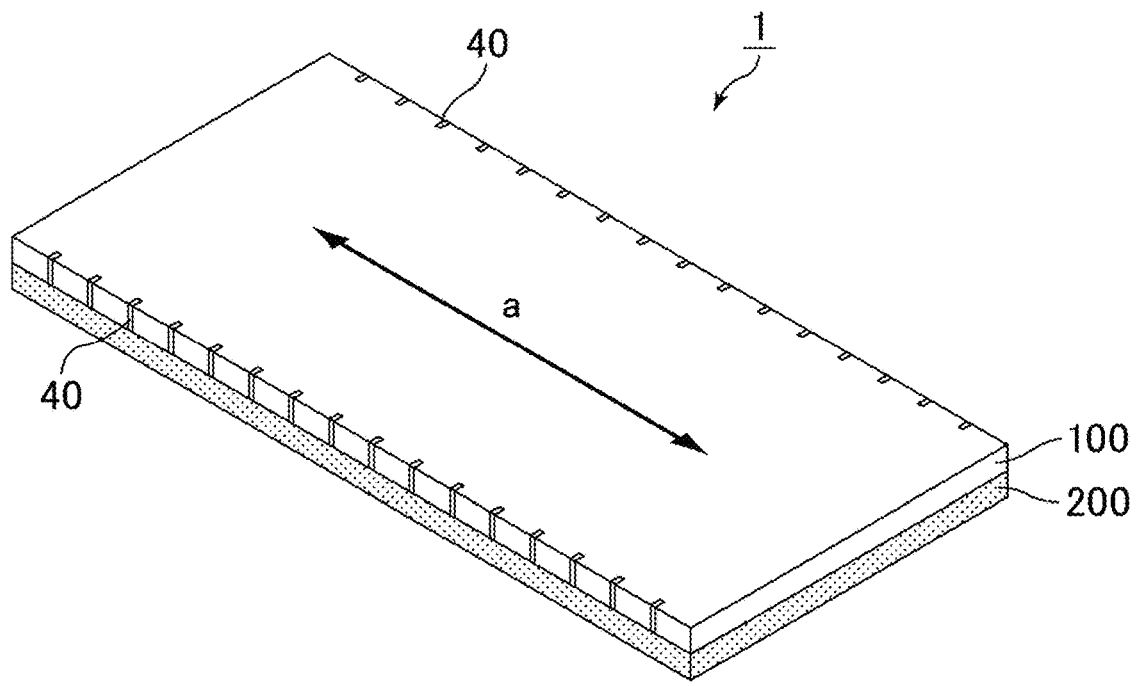
FIG. 6 is a schematic view of a display device of Embodiment 3.

FIG. 6 is a schematic view of a display device of Embodiment 3. As shown in FIG. 6, a display device 1 includes a polarizer 100 and a display panel 200 in the stated order from the viewing surface side.

In the present embodiment, the display panel 200 is a self-luminous display panel. The self-luminous display panel is suitably, for example, an organic electroluminescent (EL) display panel, a plasma display panel, a micro-LED type display panel including fine micrometer (μm)-size LEDs as RGB elements.

The display device of the present embodiment is suitably a display device in a circularly polarizing mode. Thus, the polarizer 100 is preferably a circular polarizer. A phase difference film or another optical film may be disposed between the display panel 200 and the polarizer 100.

The display device of the present embodiment, as including a self-luminous display panel as the display panel 200, requires no light source such as a backlight. Yet, the display device may further include a light source as appropriate.

Embodiments of the present invention have been described hereinabove. Each and every matter described above is applicable to the general aspects of the present invention.

EXAMPLES

The present invention is described in more detail below with reference to examples and comparative examples. These examples, however, are not intended to limit the scope of the present invention.

In each of the following examples and comparative examples, the shrinkage force in a polarizer were evaluated by the following method.

(Method of Evaluating Shrinkage Force in Polarizer)

A display panel to which polarizer (s) was/were attached was left to stand in a thermostat bath at 95° C. for two hours and then taken out of the bath, followed by measurement of warping of the display panel. A feeler gauge was used to measure the warping. The resolution (minimum measurement limit) of the feeler gauge is 0.05 mm.

(Definition of Warping)

The method above measured warping of display panels defined as follows.

(1) Definition of Warping in Comparative Examples 1 and 2 and Examples 1 to 4

Figure 7A:
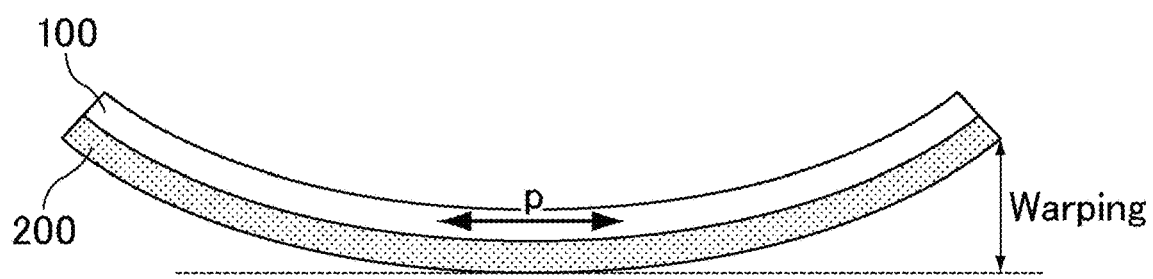
FIG. 7A is a diagram used to describe the definition of warping in Comparative Examples 1 and 2 and Examples 1 to 4.

Warping of a display panel was defined by "how much the edge (outer edge) of the display panel is raised from the midpoint of a long side of the display panel" (see FIG. 7A). In other words, warping of the long sides of the display panel 200 as defined above was measured. FIG. 7A is a diagram used to describe the definition of warping in Comparative Examples 1 and 2 and Examples 1 to 4. In FIG. 7A, p indicates the axis direction (absorption axis direction or transmission axis direction) of the polarizer 100 parallel to the long sides of the display panel 200. The larger the shrinkage force in the polarizer 100, the greater the warping of the display panel 200 to be measured. Thus, measurement of warping of the display panel 200 allows evaluation of the shrinkage force in the polarizer 100.

(2) Definition of Warping in Comparative Example 3 and Example 5

Figure 7B:
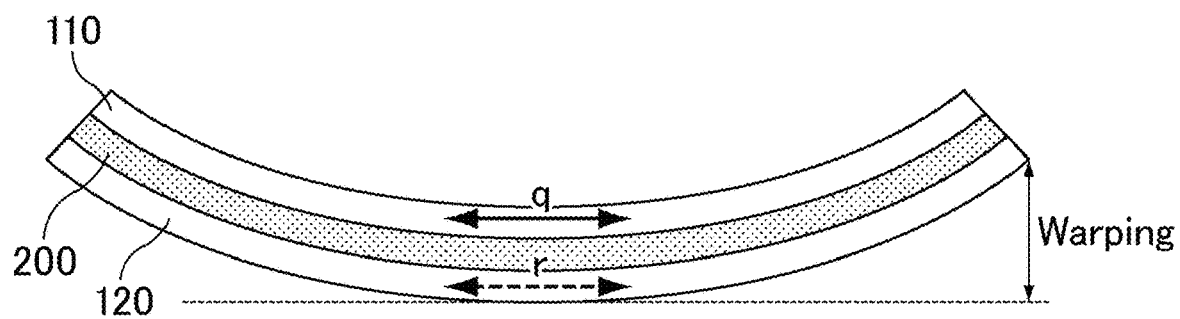
FIG. 7B is a diagram used to describe the definition of warping in Comparative Example 3 and Example 5.

Warping of a display panel was defined by "how much the edge (outer edge) of the display panel is raised from the midpoint of a long side of the display panel" (see FIG. 7B). In other words, warping of the long sides of the display panel 200 as defined above was measured. FIG. 7B is a diagram used to describe the definition of warping in Comparative Example 3 and Example 5. In FIG. 7B, q indicates the axis direction (absorption axis direction or transmission axis direction) of the first polarizer 110 parallel to the long sides of the display panel 200, and r indicates the axis direction (absorption axis direction or transmission axis direction) of the second polarizer 120 parallel to the long sides of the display panel 200. The larger the shrinkage force differential between the first polarizer 110 and the second polarizer 120, the greater the warping of the display panel 200 to be measured. Thus, measurement of warping of the display panel 200 allows evaluation of the shrinkage force differential between the first polarizer 110 and the second polarizer 120.

(3) Definition of Warping in Comparative Example 4 and Example 6

Figure 7C:
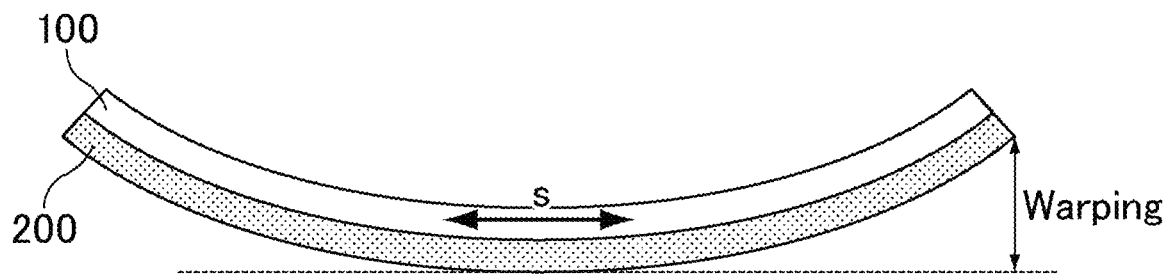
FIG. 7C is a diagram used to describe the definition of warping in Comparative Example 4 and Example 6.
Figure 7D:
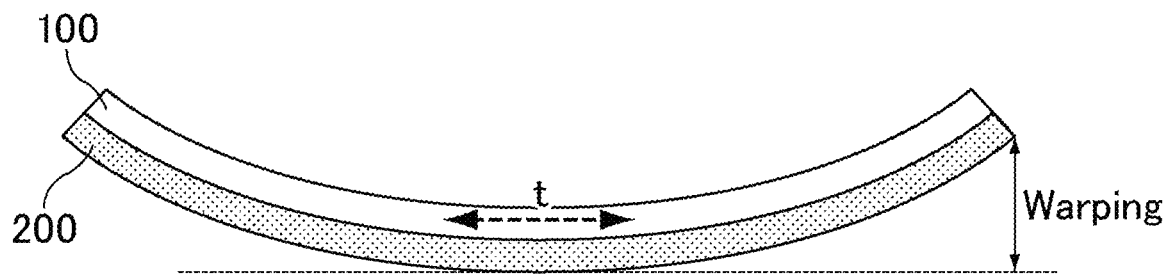
FIG. 7D is another diagram used to describe the definition of warping in Comparative Example 4 and Example 6.

Warping of a display panel was defined by "how much the edge (outer edge) of the display panel is raised from the midpoint of a side of the display panel" (see FIG. 7C and FIG. 7D). In other words, warping of the long sides of the display panel 200 and warping of the short sides of the display panel 200 as defined above were measured. FIG. 7C is a diagram used to describe the definition of warping of the long sides in the example and comparative example above. In FIG. 7C, s indicates the axis direction (absorption axis direction or transmission axis direction) of the polarizer 100 parallel to the long sides of the display panel 200. FIG. 7D is another diagram used to describe the definition of warping of the short sides in the example and comparative example above. In FIG. 7D, t indicates the axis direction (absorption axis direction or transmission axis direction) of the polarizer 100 parallel to the short sides of the display panel 200. The larger the shrinkage force in the polarizer 100, the greater the warping of the display panel 200 to be measured. Thus, measurement of warping of the display panel 200 allows evaluation of the shrinkage force in the polarizer 100.

Comparative Example 1

Figure 8:
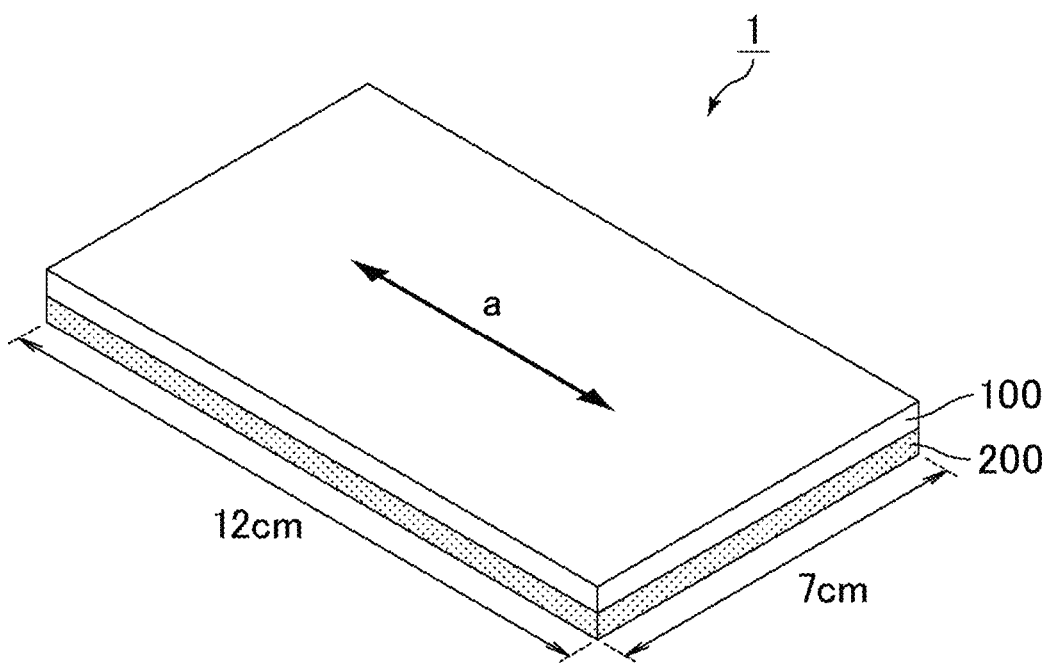
FIG. 8 is a schematic view of a display device of Comparative Example 1.

A display device having the configuration shown in FIG. 8 was produced. As shown in FIG. 8, a display device 1 of the present comparative example includes a polarizer 100 and a display panel 200 in the stated order from the viewing surface side. In the present comparative example, the polarizer 100 was disposed such that the absorption axis direction a thereof was parallel to the long sides of the display panel 200. FIG. 8 is a schematic view of a display device of Comparative Example 1.

In Comparative Examples 1 to 3 and Examples 1 to 5, the display panel 200 was a liquid crystal panel having a 12 cm (long sides)×7 cm (short sides) rectangular planar shape and a thickness of 0.3 mm. The polarizers 100, 110, and 120 were absorptive linear polarizers.

The display device produced in the present comparative example was subjected to evaluation of the shrinkage force in the polarizer by the method above. Table 1 shows the results. In the present comparative example, since the long sides of the display panel 200 and the absorption axis direction a of the polarizer 100 were set parallel to each other, p in FIG. 7A indicates the absorption axis direction a of the polarizer 100. The measurement value of warping measured in the evaluation test above is referred to as "warping in the absorption axis direction". In the present comparative example, the warping in the absorption axis direction is twice or more the warping in the transmission axis direction (Comparative Example 2). This is because the polarizer shrinks more in the absorption axis direction than in the transmission axis direction. This result shows that reduction in warping in the absorption axis direction a is important to reduce or prevent warping (see FIG. 26A and FIG. 26B).

Comparative Example 2

Figure 9:
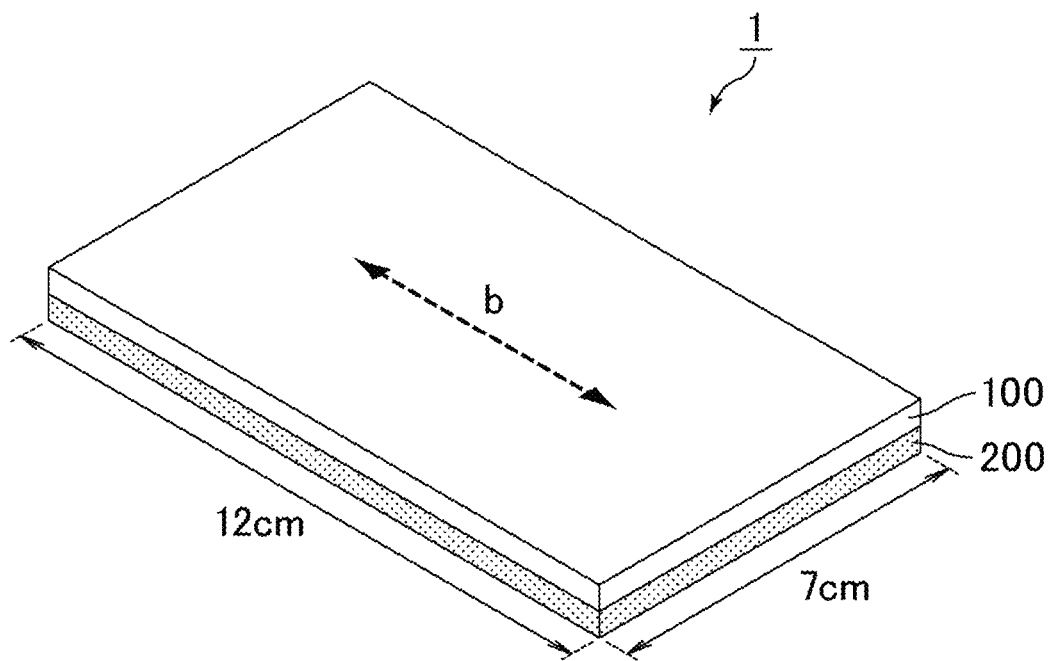
FIG. 9 is a schematic view of a display device of Comparative Example 2.

A display device having the configuration shown in FIG. 9 was produced. As shown in FIG. 9, a display device 1 of the present comparative example includes a polarizer 100 and a display panel 200 in the stated order from the viewing surface side. In the present comparative example, the polarizer 100 was disposed such that the transmission axis direction b thereof was parallel to the long sides of the display panel 200. FIG. 9 is a schematic view of a display device of Comparative Example 2.

The display device produced in the present comparative example was subjected to evaluation of the shrinkage force in the polarizer by the method above. Table 2 shows the results. In the present comparative example, since the long sides of the display panel 200 and the transmission axis direction b of the polarizer 100 were set parallel to each other, p in FIG. 7A indicates the transmission axis direction b of the polarizer 100. The measurement value of warping measured in the evaluation test above is referred to as "warping in the transmission axis direction". In the present comparative example, the warping in the transmission axis direction is half or less the warping in the absorption axis direction (Comparative Example 1). This is because the polarizer shrinks more in the absorption axis direction than in the transmission axis direction. This result shows that increase in warping in the transmission axis direction is important to reduce or prevent warping (see FIG. 26A and FIG. 26B).

Comparative Example 3

Figure 10:
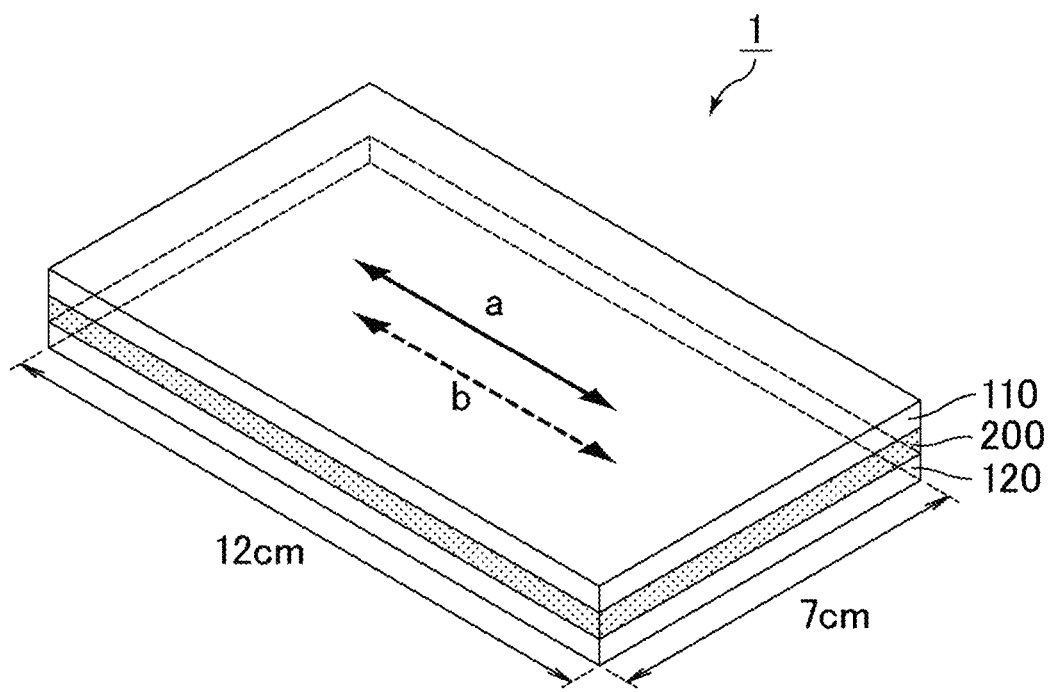
FIG. 10 is a schematic view of a display device of Comparative Example 3.

A display device having the configuration shown in FIG. 10 was produced. As shown in FIG. 10, a display device 1 of the present comparative example includes a first polarizer 110, a display panel 200, and a second polarizer 120 in the stated order from the viewing surface side. In the present comparative example, the first polarizer 110 was disposed on the viewing surface side of the display panel 200 such that the absorption axis direction a thereof was parallel to the long sides of the display panel 200. The second polarizer 120 was disposed on the back surface side of the display panel 200 such that the transmission axis direction b thereof was parallel to the long sides of the display panel 200. FIG. 10 is a schematic view of a display device of the present comparative example.

The display device produced in the present comparative example was subjected to evaluation of the shrinkage force in the polarizers by the method above. Table 3 shows the results. In the present comparative example, the long sides of the display panel 200 and the absorption axis direction a of the first polarizer 110 were set parallel to each other, and the long sides of the display panel 200 and the transmission axis direction b of the second polarizer 120 were set parallel to each other. Thus, q in FIG. 7B indicates the absorption axis direction a of the first polarizer 110, and r indicates the transmission axis direction b of the second polarizer 120. In the present comparative example, since the long sides of the display panel 200 and the absorption axis direction a of the first polarizer 110 were parallel to each other, the measurement value of warping measured in the evaluation test above is referred to as "warping in the absorption axis direction of the first polarizer 110".

Comparative Example 4

Figure 11:
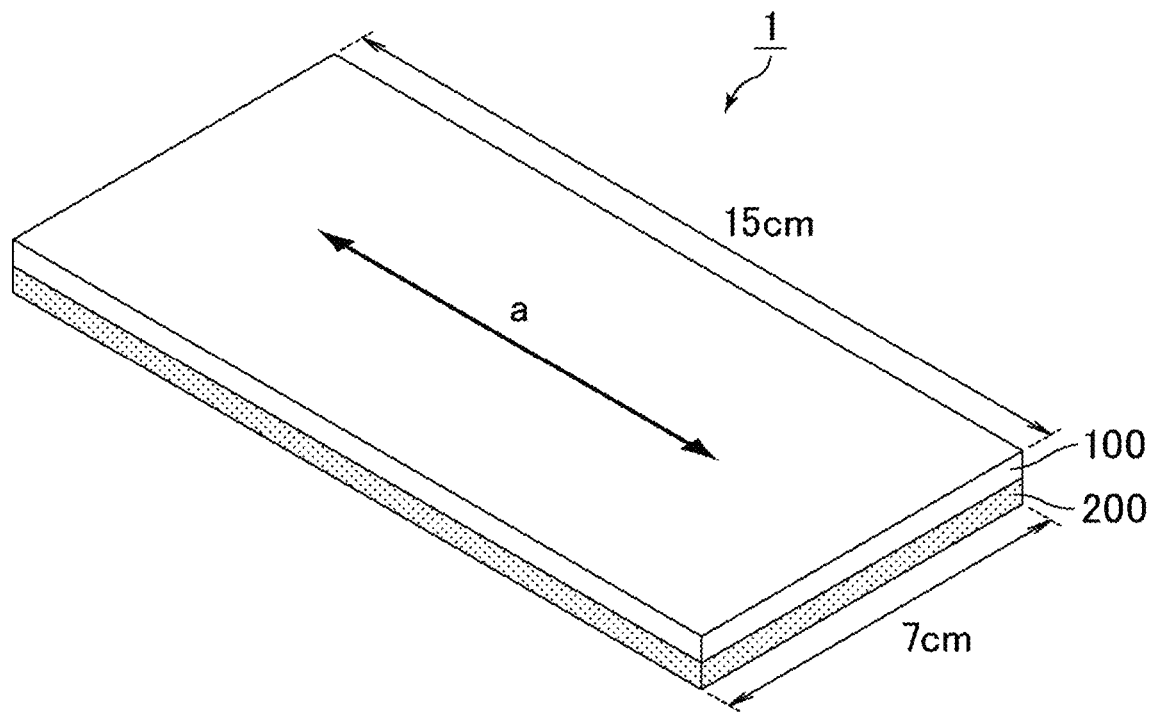
FIG. 11 is a schematic view of a display device of Comparative Example 4.

A display device having the configuration shown in FIG. 11 was produced. As shown in FIG. 11, a display device 1 of the present comparative example includes a polarizer 100 and a display panel 200 in the stated order from the viewing surface side. In the present comparative example, the polarizer 100 was disposed such that the absorption axis direction a thereof was parallel to the long sides of the display panel 200. FIG. 11 is a schematic view of a display device of the present comparative example.

In Comparative Example 4 and Example 6, the display panel 200 was a glass substrate OLED panel having a 15 cm (long sides)×7 cm (short sides) rectangular planar shape and a thickness of 0.3 mm, and the polarizer 100 was a circular polarizer for antireflection.

The display device produced in the present comparative example was subjected to evaluation of the shrinkage force in the polarizer by the method above. Table 4 shows the results. In the present comparative example, since the long sides of the display panel 200 and the absorption axis direction a of the polarizer 100 were set parallel to each other, s in FIG. 7C indicates the absorption axis direction a of the polarizer 100 and t in FIG. 7D indicates the transmission axis direction b of the polarizer 100. The measurement value of warping of the long sides measured in the evaluation test above is referred to as "warping in the absorption axis direction (absorption axis direction warping)", and the measurement value of warping of the short sides measured in the evaluation test above is referred to as "warping in the transmission axis direction (transmission axis direction warping)".

Example 1

Figure 12:
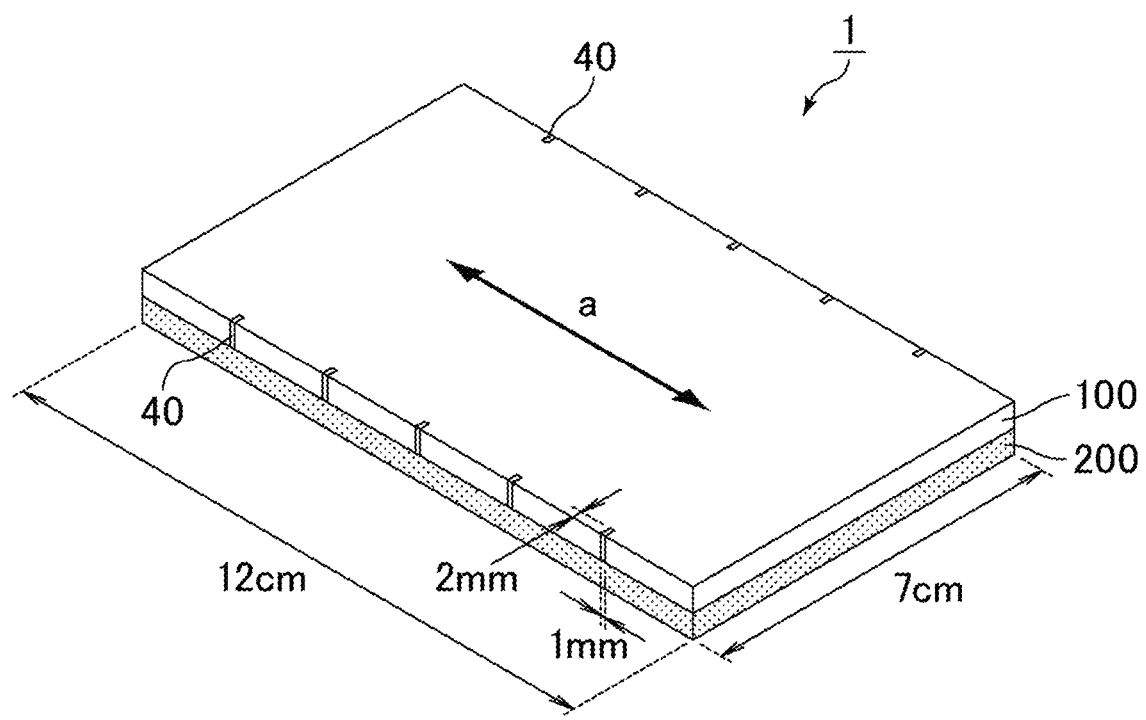
FIG. 12 is a schematic view of a display device of Example 1.
Figure 13:
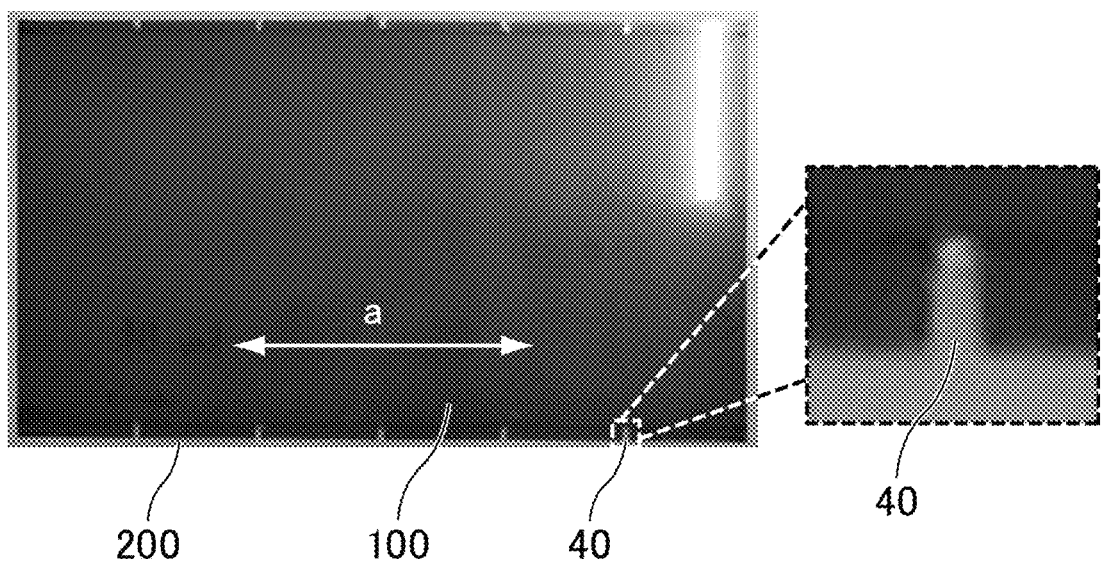
FIG. 13 is a photograph of the viewing surface side of the display device of Example 1 with an enlarged view of a notch 40.

A display device having the configuration shown in FIG. 12 was produced. As shown in FIG. 12, a display device 1 of the present example includes a polarizer 100 and a display panel 200 in the stated order from the viewing surface side. In the present example, the polarizer 100 was disposed such that the absorption axis direction a thereof was parallel to the long sides of the display panel 200. FIG. 12 is a schematic view of the display device of the present example. In the present example, the polarizer 100 was provided with five notches 40 in the absorption axis direction a thereof at equal intervals. The size of each notch 40 was 1 mm in width (W) and 2 mm in length (L). All the notches 40 were within a frame region 320 of the display device 1 and thus did not affect the display quality of the liquid crystal panel. FIG. 13 is a photograph of the viewing surface side of the display device of the present example with an enlarged view of a notch 40. The polarizer 100, as shown in FIG. 4, has a three-layer structure consisting of a protective layer 50, an adhesion layer 60, and a polarizing layer 70, and each of the three layers was provided with the notches 40 such that the arrangement and size of the notches 40 in the polarizer 100 would be as described above and the positions of the notches 40 in the layers would match (see FIG. 4).

The display device produced in the present example was subjected to evaluation of the shrinkage force in the polarizer by the method above. Table 1 shows the results. In the present example, since the long sides of the display panel 200 and the absorption axis direction a of the polarizer 100 were set parallel to each other, p in FIG. 7A indicates the absorption axis direction a of the polarizer 100. The degree of warping in the present example was smaller than that in Comparative Example 1 where no notches 40 were provided. This result shows that the notches 40 contributed to reduction in the shrinkage force in the absorption axis direction of the polarizer 100.

Example 2

Figure 14:
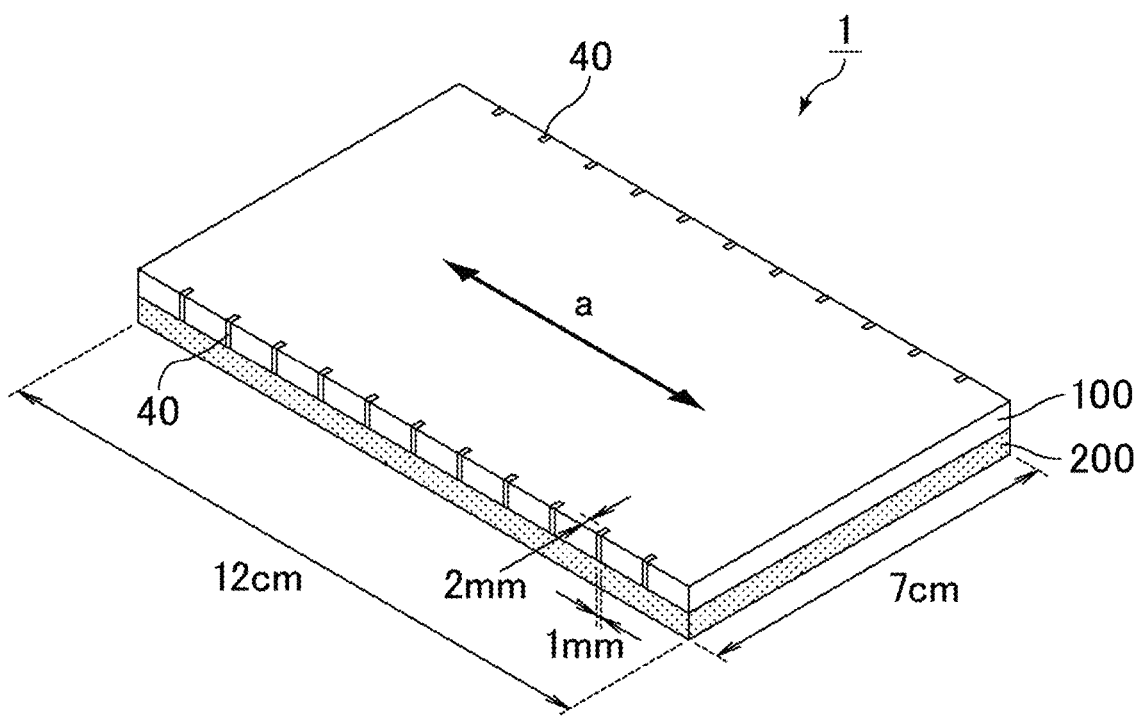
FIG. 14 is a schematic view of a display device of Example 2.

A display device having the configuration shown in FIG. 14 was produced. As shown in FIG. 14, a display device 1 of the present example includes a polarizer 100 and a display panel 200 in the stated order from the viewing surface side. In the present example, the polarizer 100 was disposed such that the absorption axis direction a thereof was parallel to the long sides of the display panel 200. FIG. 14 is a schematic view of the display device of the present example. In the present example, the polarizer 100 was provided with eleven notches 40 in the absorption axis direction a thereof at equal intervals. The size of each notch 40 was 1 mm in width (W) and 2 mm in length (L). All the notches 40 were within a frame region 320 of the display device 1 and thus did not affect the display quality of the liquid crystal panel.

Figure 15:
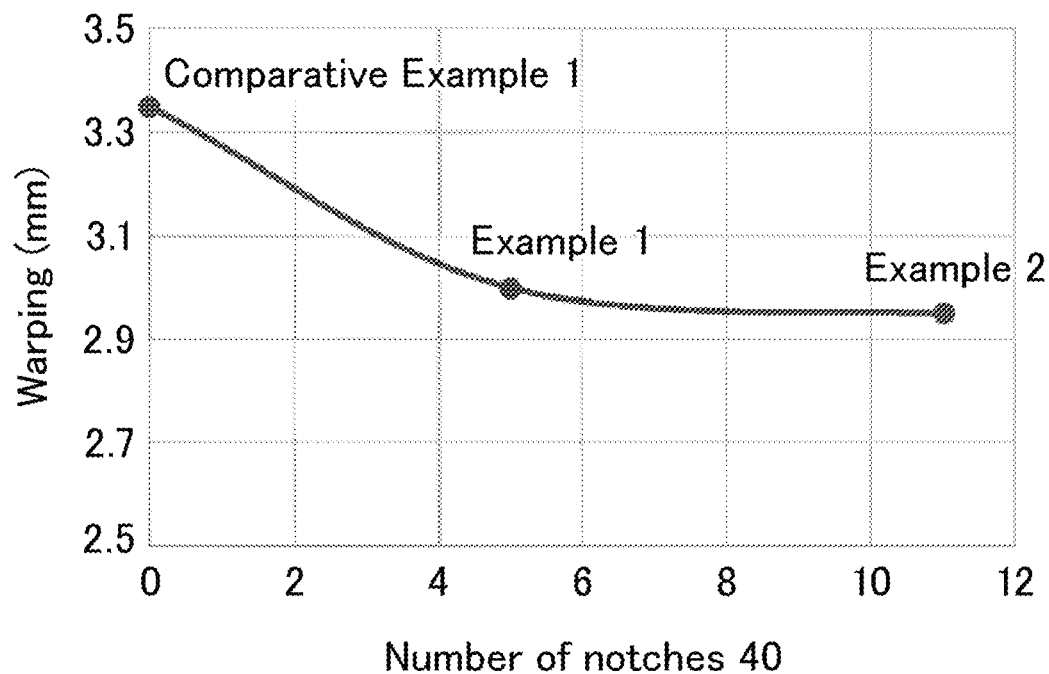
FIG. 15 is a study graph showing the relationship between the number of notches 40 per side of a polarizer and warping (mm) in the absorption axis direction in each of Comparative Example 1, Example 1, and Example 2.

The display device produced in the present example was subjected to evaluation of warping. Table 1 shows the results. In the present example, since the long sides of the display panel 200 and the absorption axis direction a of the polarizer 100 were set parallel to each other, p in FIG. 7A indicates the absorption axis direction a of the polarizer 100. The degree of warping in the present example was smaller than that in Comparative Example 1 where no notches 40 were provided and that in Example 1 where the number of the notches 40 was different. This result shows that changing the number of the notches 40 enables adjustment of the shrinkage force in the absorption axis direction a of the polarizer 100. FIG. 15 is a study graph showing the relationship between the number of notches 40 per side of a polarizer and warping (mm) in the absorption axis direction based on Comparative Example 1, Example 1, and Example 2.

Example 3

Figure 16:
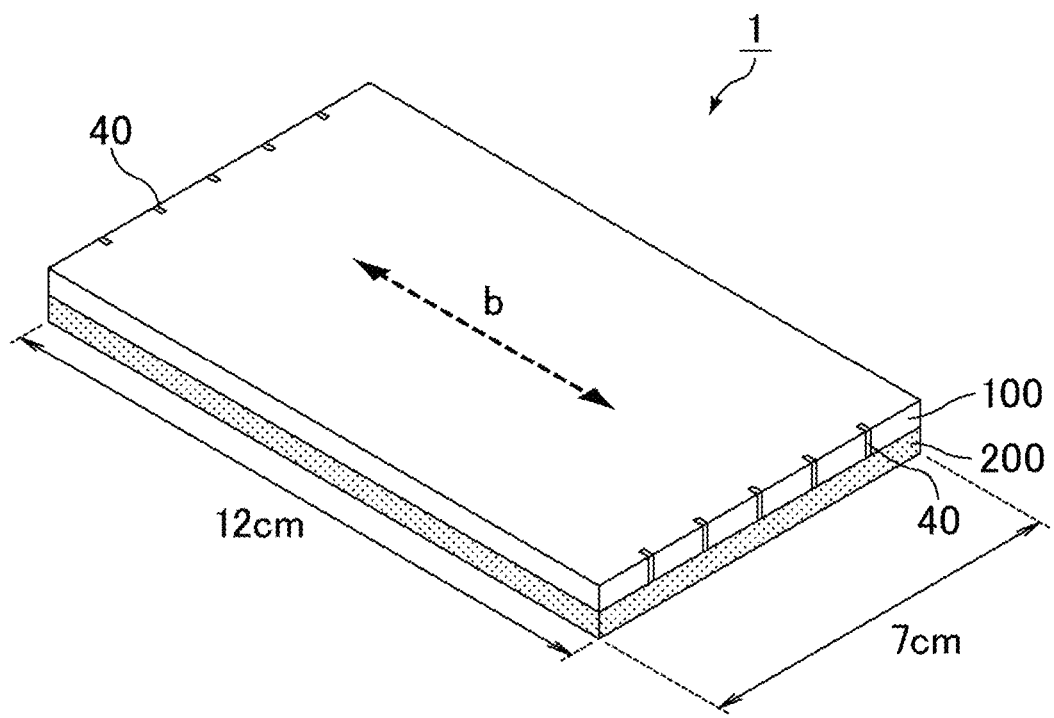
FIG. 16 is a schematic view of a display device of Example 3.
Figure 17:
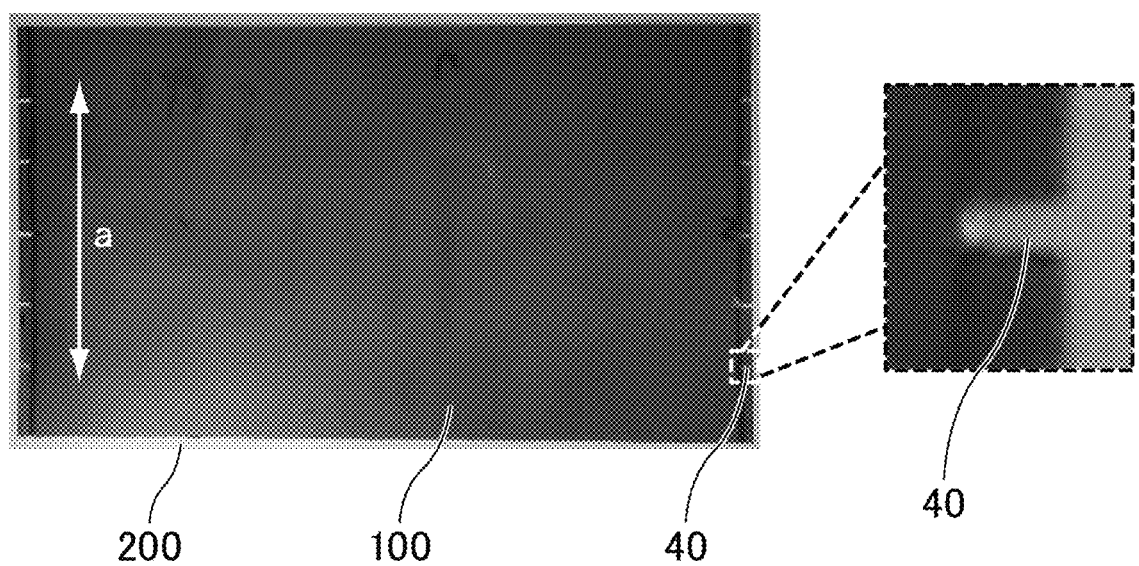
FIG. 17 is a photograph of the viewing surface side of the display device of Example 3 with an enlarged view of a notch 40.

A display device having the configuration shown in FIG. 16 was produced. As shown in FIG. 16, a display device 1 of the present example includes a polarizer 100 and a display panel 200 in the stated order from the viewing surface side. In the present example, the polarizer 100 was disposed such that the transmission axis direction b thereof was parallel to the long sides of the display panel 200. FIG. 16 is a schematic view of the display device of the present example. In the present example, the polarizer 100 was provided with five notches 40 in the absorption axis direction a thereof at equal intervals. The size of each notch 40 was 1 mm in width (W) and 2 mm in length (L). All the notches 40 were within a frame region 320 of the display device 1 and thus did not affect the display quality of the liquid crystal panel. FIG. 17 is a photograph of the viewing surface side of the display device actually produced in the present example with an enlarged view of a notch 40.

The display device produced in the present example was subjected to evaluation of the shrinkage force in the polarizer by the method above. Table 2 shows the results. In the present example, since the long sides of the display panel 200 and the transmission axis direction b of the polarizer 100 were set parallel to each other, p in FIG. 7A indicates the transmission axis direction b of the polarizer 100. The degree of warping in the present example was larger than that in Comparative Example 2 where no notches 40 were provided. This result shows that the notches 40 contributed to an increase in the shrinkage force in the transmission axis direction of the polarizer.

Example 4

Figure 18:
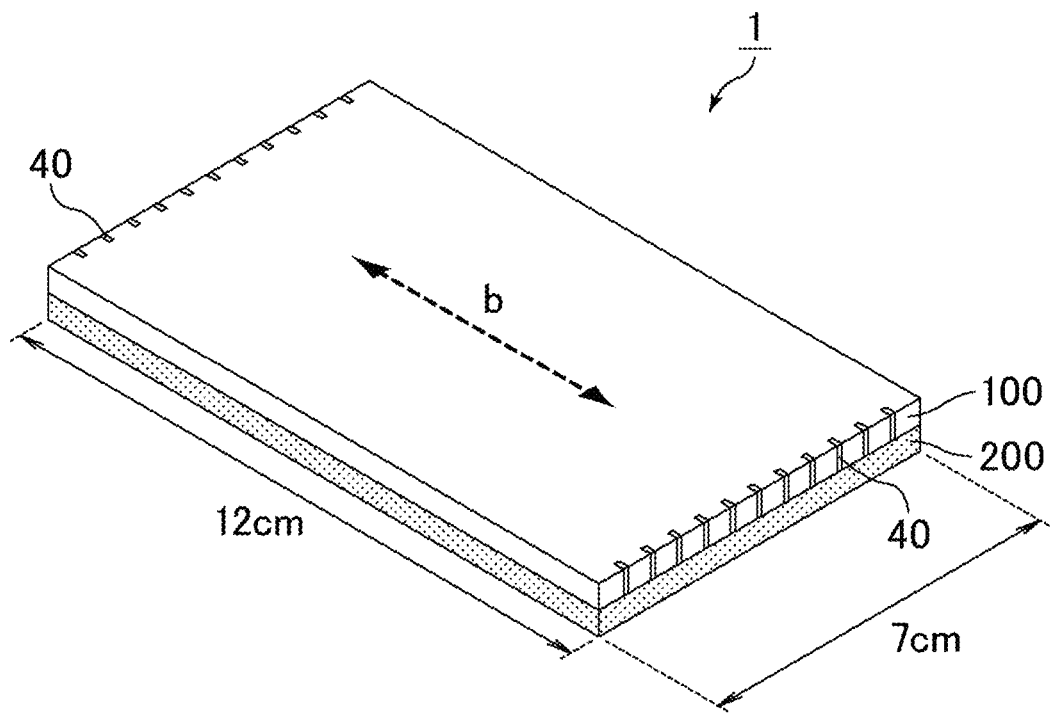
FIG. 18 is a schematic view of a display device of Example 4.

A display device having the configuration shown in FIG. 18 was produced. As shown in FIG. 18, a display device 1 of the present example includes a polarizer 100 and a display panel 200 in the stated order from the viewing surface side. In the present example, the polarizer 100 was disposed such that the transmission axis direction b thereof was parallel to the long sides of the display panel 200. FIG. 18 is a schematic view of the display device of the present example. In the present example, the polarizer 100 was provided with eleven notches 40 in the absorption axis direction a thereof at equal intervals. The size of each notch 40 was 1 mm in width (W) and 2 mm in length (L). All the notches 40 were within a frame region 320 of the display device 1 and thus did not affect the display quality of the liquid crystal panel.

Figure 19:
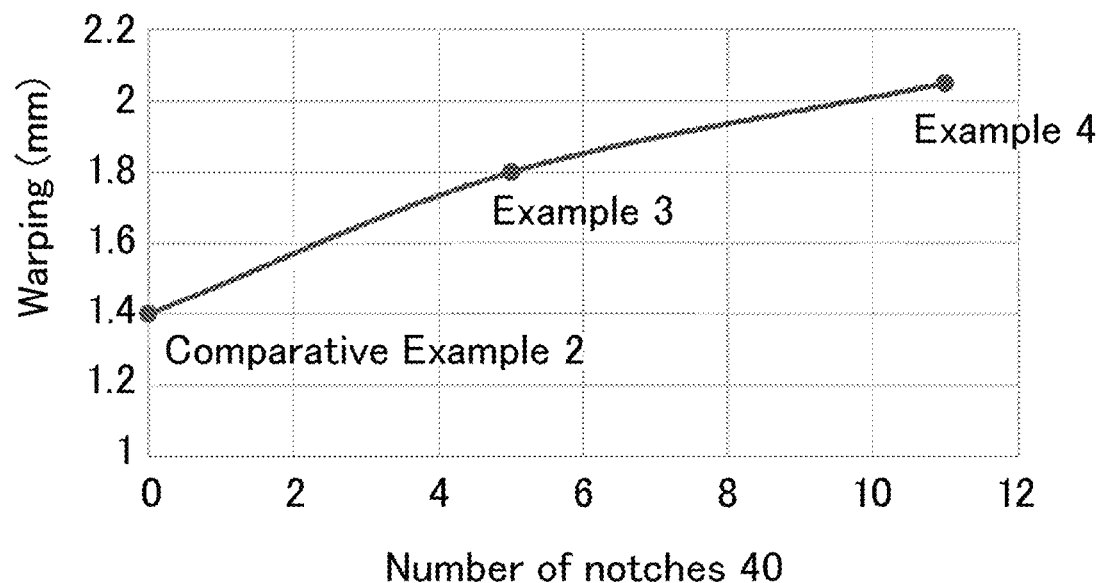
FIG. 19 is a study graph showing the relationship between the number of notches 40 per side of a polarizer and warping (mm) in the transmission axis direction in each of Comparative Example 2, Example 3, and Example 4.

The display device produced in the present example was subjected to evaluation of the shrinkage forces in the polarizer by the method above. Table 2 shows the results. In the present example, since the long sides of the display panel 200 and the transmission axis direction b of the polarizer 100 were set parallel to each other, p in FIG. 7A indicates the transmission axis direction b of the polarizer 100. The degree of warping in the present example was larger than that in Comparative Example 2 where no notches 40 were provided and that in Example 3 where the number of the notches 40 was different. This result shows that changing the number of the notches 40 enables adjustment of the shrinkage force in the transmission axis direction b of the polarizer. FIG. 19 is a study graph showing the relationship between the number of notches 40 per side of a polarizer and warping (mm) in the transmission axis direction in each of Comparative Example 2, Example 3, and Example 4.

Example 5

Figure 20:
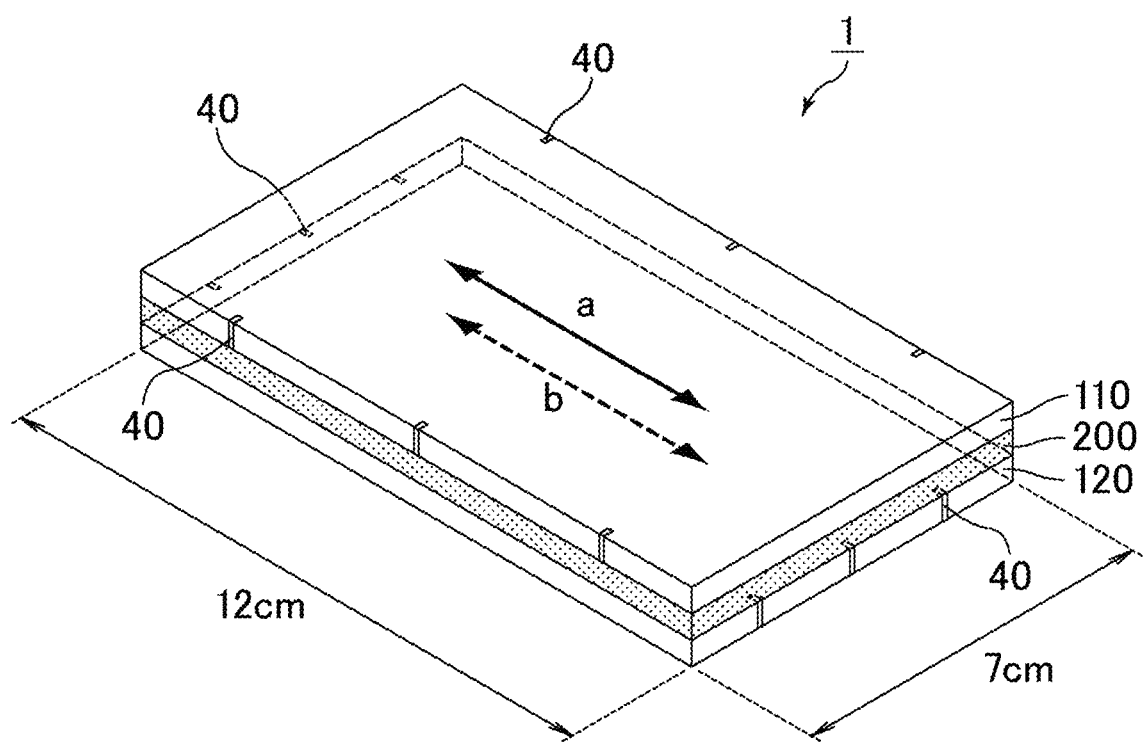
FIG. 20 is a schematic view of a display device of Example 5.

A display device having the configuration shown in FIG. 20 was produced. As shown in FIG. 20, a display device 1 of the present example includes a first polarizer 110, a display panel 200, and a second polarizer 120 in the stated order from the viewing surface side. In the present example, the first polarizer 110 was disposed on the viewing surface side of the display panel 200 such that the absorption axis direction a thereof was parallel to the long sides of the display panel 200. The second polarizer 120 was disposed on the back surface side of the display panel 200 such that the transmission axis direction b thereof was parallel to the long sides of the display panel 200. FIG. 20 is a schematic view of the display device of the present example. In the present example, the polarizer 110 was provided with three notches 40 in the absorption axis direction (along the long sides) of the polarizer 110 at equal intervals and the polarizer 120 was provided with three notches 40 in the absorption axis direction (along the short sides) of the polarizer 120 at equal intervals. The size of each notch 40 was 1 mm in width (W) and 2 mm in length (L). All the notches 40 were within a frame region 320 of the display device 1 and thus did not affect the display quality of the liquid crystal panel.

The display device produced in the present example was subjected to evaluation of the shrinkage force in the polarizer by the method above. Table 3 shows the results. In the present example, the long sides of the display panel 200 and the absorption axis direction a of the first polarizer 110 were set parallel to each other, and the long sides of the display panel 200 and the transmission axis direction b of the second polarizer 120 were set parallel to each other. Thus, q in FIG. 7B indicates the absorption axis direction a of the first polarizer 110, and r indicates the transmission axis direction b of the second polarizer 120. The degree of warping in the present example was reduced by as much as about 40% as compared with that in Comparative Example 3 where no notches 40 were provided.

Example 6

Figure 21:
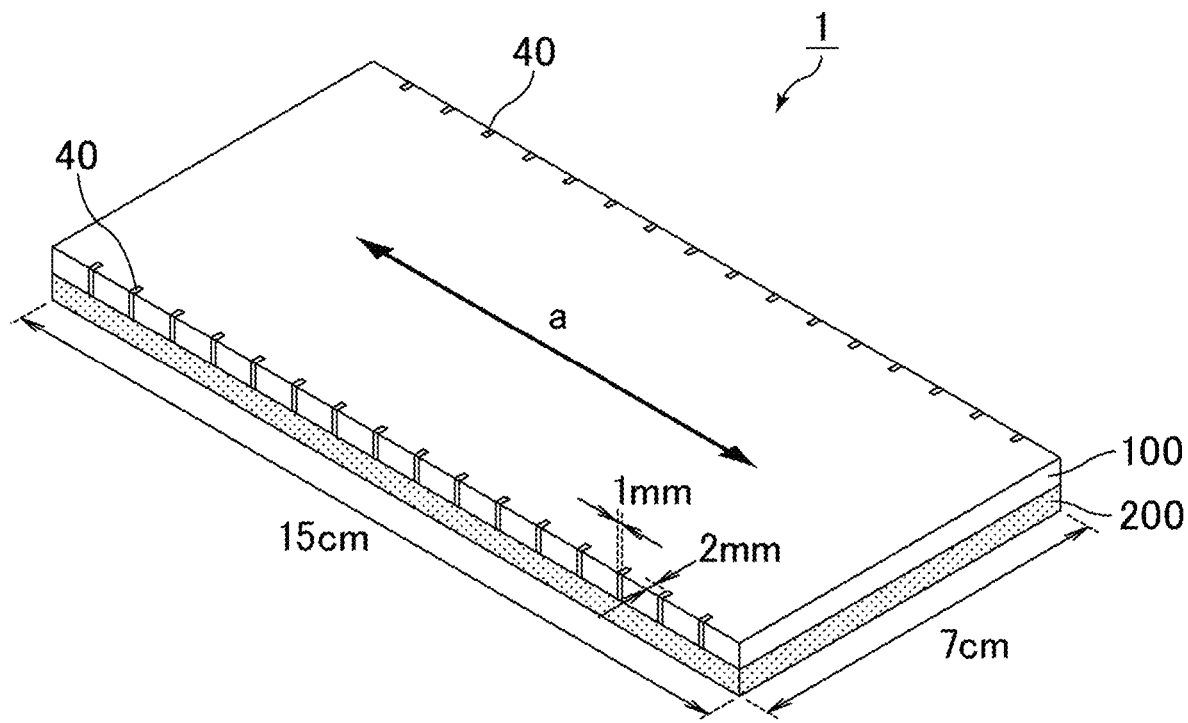
FIG. 21 is a schematic view of a display device of Example 6.
Figure 22:
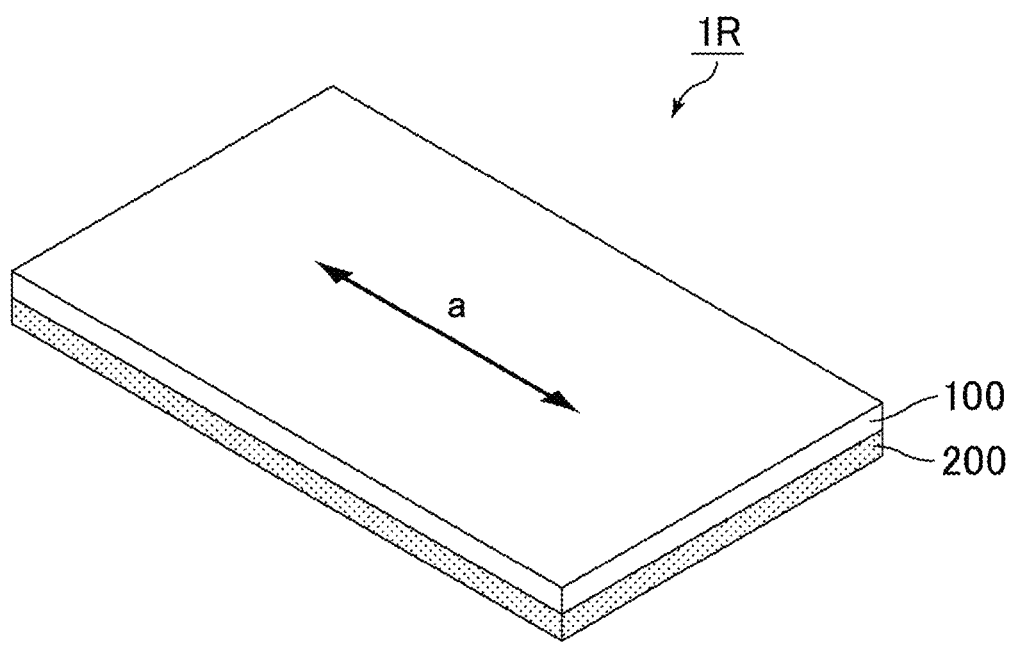
FIG. 22 is a schematic view of a typical example of a conventional display device.
Figure 23:
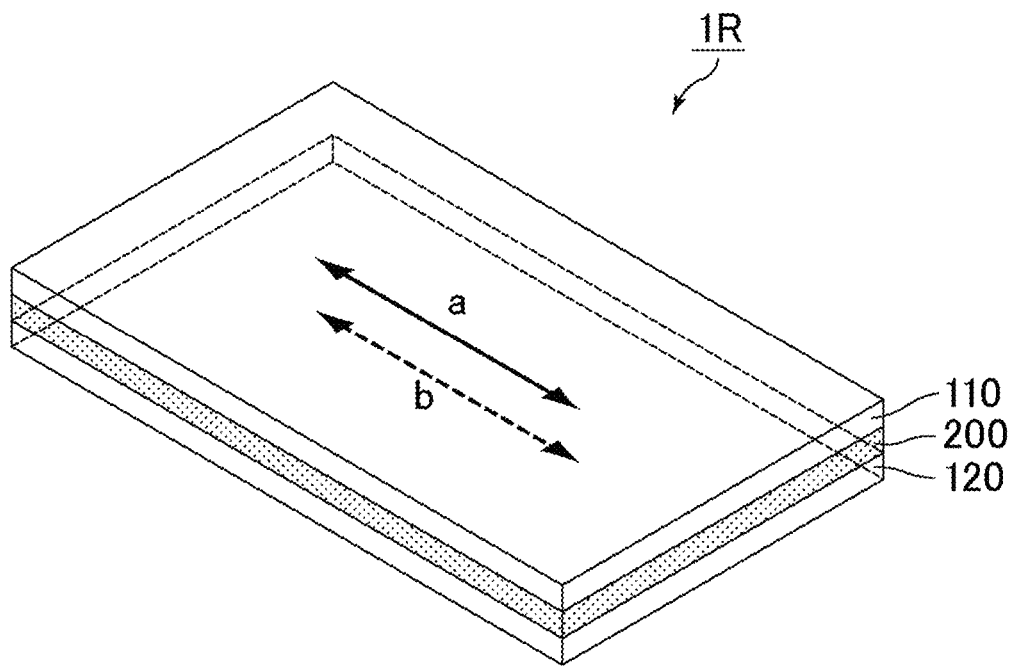
FIG. 23 is a schematic view of another typical example of a conventional display device.
Figure 24:
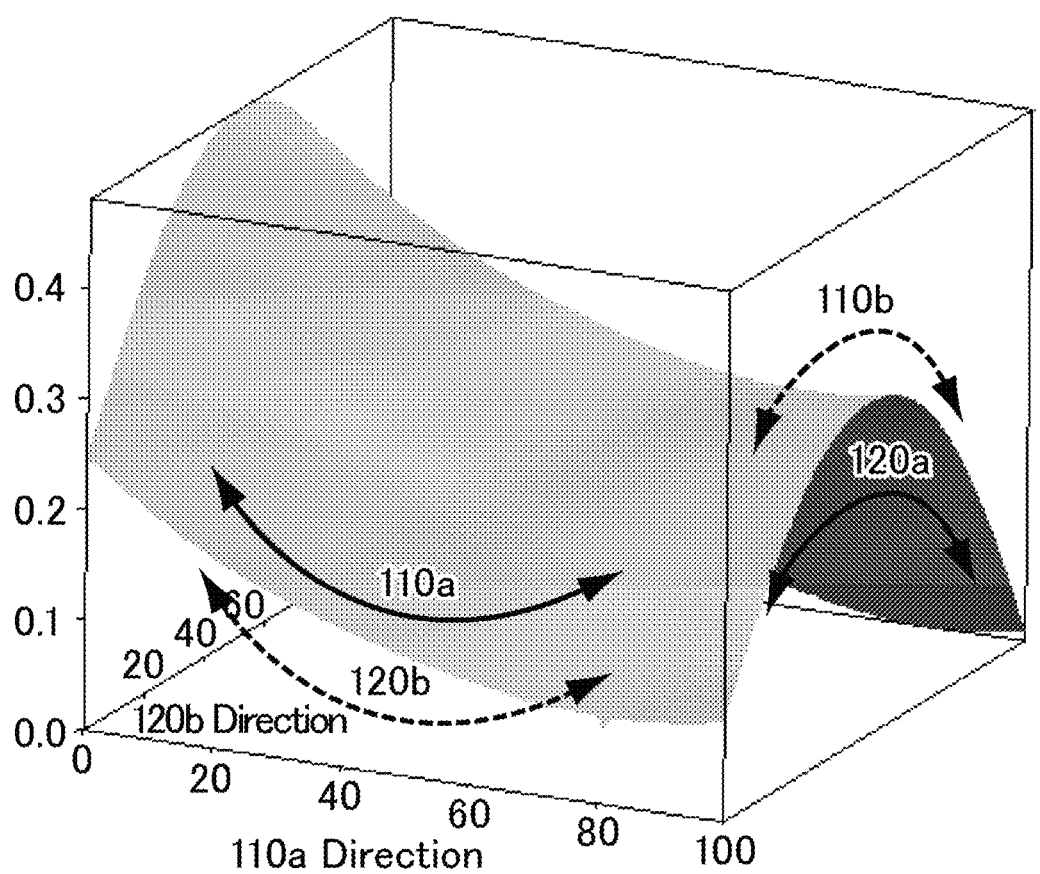
FIG. 24 is a diagram conceptually showing the relationship between warping and the absorption axis direction (reflection axis direction) a or the transmission axis direction b of each polarizer in a display device in which a display panel is sandwiched between a pair of polarizers arranged in crossed Nicols.
Figure 25A:
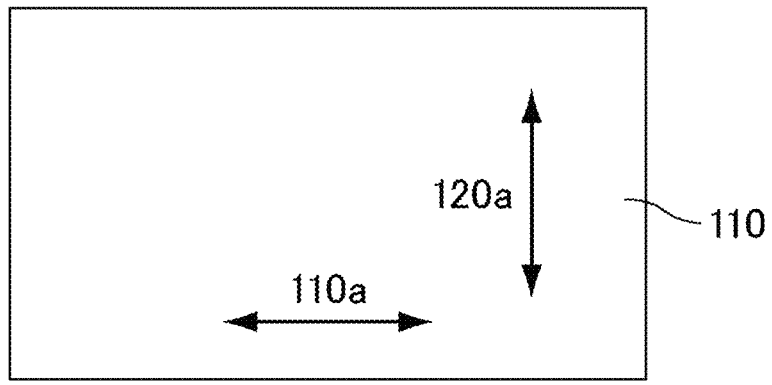
FIG. 25A is a study diagram of the cause of warping in a display device including a display panel sandwiched between a pair of polarizers arranged in crossed Nicols.
Figure 25B:
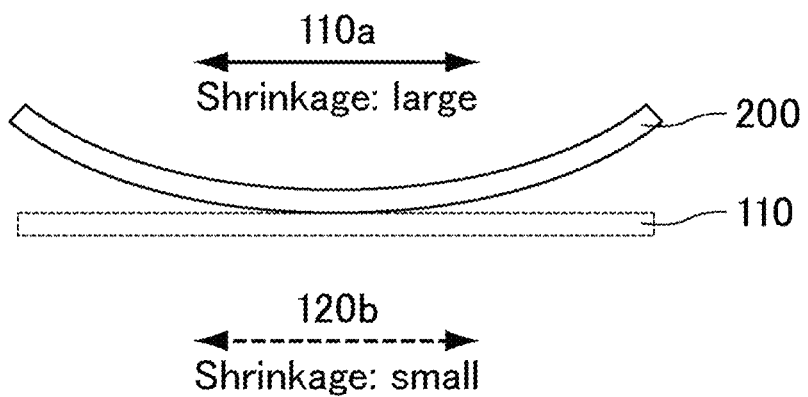
FIG. 25B is another study diagram of the cause of warping in a display device including a display panel sandwiched between a pair of polarizers arranged in crossed Nicols.
Figure 25C:
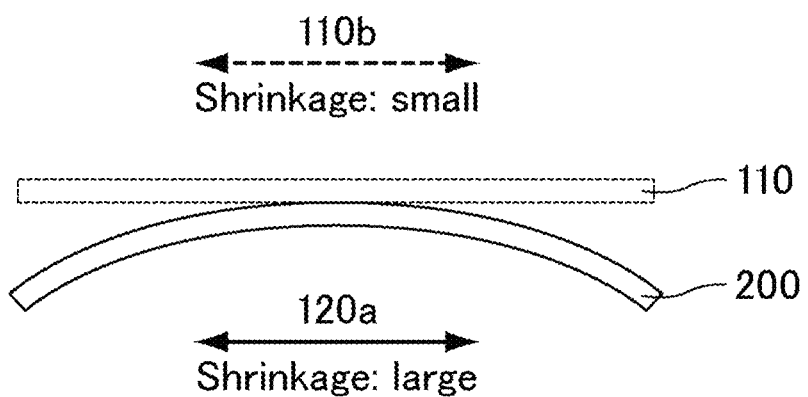
FIG. 25C is yet another study diagram of the cause of warping in a display device including a display panel sandwiched between a pair of polarizers arranged in crossed Nicols.

A display device having the configuration shown in FIG. 21 was produced. As shown in FIG. 21, a display device 1 of the present example includes a polarizer 100 and a display panel 200 in the stated order from the viewing surface side. In the present example, the polarizer 100 was disposed such that the absorption axis direction a thereof was parallel to the long sides of the display panel 200. FIG. 21 is a schematic view of the display device of the present example. In the present example, the polarizer 100 was provided with sixteen notches 40 in the absorption axis direction a thereof at equal intervals. The size of each notch 40 was 1 mm in width (W) and 2 mm in length (L). All the notches 40 were within a frame region 320 of the display device 1 and thus did not affect the display quality of the liquid crystal panel.

The display device produced in the present example was subjected to evaluation of the shrinkage force in the polarizer by the method above. Table 4 shows the results. In the present example, since the long sides of the display panel 200 and the absorption axis direction a of the polarizer 100 were set parallel to each other, s in FIG. 7C indicates the absorption axis direction a of the polarizer 100 and t in FIG. 7D indicates the transmission axis direction b of the polarizer 100. The measurement value of warping of the long sides measured in the evaluation above is referred to as "warping in the absorption axis direction (absorption axis direction warping)", and the measurement value of warping of the short sides measured in the evaluation test above is referred to as "warping in the transmission axis direction (transmission axis direction warping)".

TABLE 1

|  | Comparative Example 1 | Example 1 | Example 2 |
|---|---|---|---|
| Number of notches | None | 5 | 11 |
| Warping [mm] | 3.35 | 3.00 | 2.95 |

TABLE 2

|  | Comparative Example 2 | Example 3 | Example 4 |
|---|---|---|---|
| Number of notches | None | 5 | 11 |
| Warping [mm] | 1.40 | 1.80 | 2.05 |

TABLE 3

|  | Comparative Example 3 | Example 5 |
|---|---|---|
| Number of notches | None | 3 for each layer |
| Warping [mm] | 1.35 | 0.85 |

TABLE 4

|  | Comparative Example 4 | Example 6 |
|---|---|---|
| Number of notches | None | 16 |
| Absorption axis direction warping [mm] | 1.25 | 1.10 |
| Transmission axis direction warping [mm] | 0.30 | 0.35 |

The embodiments of the present invention described above may be combined as appropriate within the range not departing from the gist of the present invention.

REFERENCE SIGNS LIST 1, 1R: display device
100: polarizer
110: first polarizer
110a: absorption axis or absorption axis direction of first polarizer, or reflection axis or reflection axis direction of first polarizer
110b: transmission axis or transmission axis direction of first polarizer
120: second polarizer
120a: absorption axis or absorption axis direction of second polarizer, or reflection axis or reflection axis direction of second polarizer
120b: transmission axis or transmission axis direction of second polarizer
200: display panel
310: display region
320: frame region
40: notch
50: protective layer
60: adhesion layer
70: polarizing layer
a: absorption axis or absorption axis direction of polarizer, or reflection axis or reflection axis direction of polarizer
b: transmission axis or transmission axis direction of polarizer

What is claimed is:

1. A display device comprising:
a display panel; and
a polarizer,
the polarizer being provided with at least one notch that extends from an outer edge of the polarizer with a fixed width in an extension direction that makes an arbitrary angle with the outer edge in planer view, wherein
the extension direction extends toward an inside of the polarizer,
a length in the extension direction of the at least one notch is longer than a width in a direction orthogonal to the extension direction of the at least one notch,
the at least one notch comprises six or more notches, and
the six or more notches include three or more first notches provided on a first side of the polarizer and three or more second notches provided on a second side of the polarizer opposite the first side.

2. The display device according to claim 1, further comprising:
a display region and a frame region arranged to surround the display region, wherein
the at least one notch is provided only in the frame region.

3. A display device comprising:
a display panel;
a first polarizer; and
a second polarizer, wherein
the first polarizer, the display panel, and the second polarizer are arranged in the stated order,
a transmission axis of the first polarizer and a transmission axis of the second polarizer are orthogonal to each other,
at least one polarizer selected from the group consisting of the first polarizer and the second polarizer is provided with at least one notch that extends from an outer edge of the at least one polarizer with a fixed width in an extension direction that makes an arbitrary angle with the outer edge in planer view, wherein
the extension direction extends toward an inside of the at least one polarizer,
a length in the extension direction of the at least one notch is longer than a width in a direction orthogonal to the extension direction of the at least one notch,
the at least one notch comprises six or more notches, and
the six or more notches include three or more first notches provided on a first side of the at least one polarizer and three or more second notches provided on a second side of the at least one polarizer opposite the first side.

4. The display device according to claim 1,
wherein the polarizer provided with the at least one notch includes a protective layer, an adhesion layer, and a polarizing layer, and
at least one layer selected from the group consisting of the protective layer, the adhesion layer, and the polarizing layer is provided with the at least one notch.

5. The display device according to claim 1,
wherein the polarizer is a linear polarizer.

6. The display device according to claim 1,
wherein the display panel is a liquid crystal panel including a liquid crystal layer.

7. The display device according to claim 1, further comprising a light source.

8. The display device according to claim 1,
wherein
the three or more first notches are arranged in an absorption axis direction or a reflection axis direction of the polarizer.

9. The display device according to claim 8,
wherein the three or more first notches are arranged at equal intervals.

10. The display device according to claim 1,
wherein the polarizer has a quadrangular planar shape.

11. The display device according to claim 1,
wherein in a view of the polarizer from a direction in which the first side and the second side are opposite each other, positions of the three or more first notches and positions of the three or more second notches are respectively matched.

12. The display device according to claim 1,
wherein the three or more first notches include a first notch provided in a center of the first side, and
the three or more second notches include a second notch provided in a center of the second side.

13. A display device comprising:
a display panel;
a first polarizer; and
a second polarizer, wherein
the first polarizer, the display panel, and the second polarizer are arranged in the stated order,
a transmission axis of the first polarizer and a transmission axis of the second polarizer are orthogonal to each other,
each of the first polarizer and the second polarizer is provided with at least one notch that extends inward from an outer edge of each of the first polarizer and the second polarizer, and
the at least one notch in the first polarizer does not overlap the at least one notch in the second polarizer.

14. The display device according to claim 4,
wherein at least two layers selected from the group consisting of the protective layer, the adhesion layer, and the polarizing layer are provided with the at least one notch, and
positions of the notches in the at least two layers are matched.

15. The display device according to claim 12,
wherein the three or more first notches further include a first notch provided in one end side of the first side rather than the center of the first side and a first notch provided in the other end side of the first side rather than the center of the first side, and
the three or more second notches further include a second notch provided in one end side of the second side rather than the center of the second side and a second notch provided in the other end side of the second side rather than the center of the second side.

16. The display device according to claim 1,
wherein the at least one notch comprises five or more first notches provided on the first side of the polarizer.

17. The display device according to claim 1,
wherein the length in the extension direction of the at least one notch is 1 mm or longer and 10 mm or shorter, and
the width in the direction orthogonal to the extension direction of the at least one notch is greater than 0 mm and 3 mm or smaller.

18. The display device according to claim 1,
wherein the extension direction is a direction orthogonal to the outer edge in the planar view and towards the inside of the polarizer.

* * * * *